United States Patent [19]
Hijikata et al.

[11] Patent Number: 5,974,876
[45] Date of Patent: Nov. 2, 1999

[54] MAP INFORMATION DISPLAYING APPARATUS, NAVIGATION APPARATUS AND PROGRAM STORAGE DEVICE READABLE BY THE NAVIGATION APPARATUS

[75] Inventors: Makoto Hijikata, Kawagoe; Keisuke Ito; Tomoko Shiota, both of Tokyo-to, all of Japan

[73] Assignees: Pioneer Electronic Corporation; Pioneer Design Corporation, both of Tokyo-to, Japan

[21] Appl. No.: 08/927,093

[22] Filed: Sep. 10, 1997

[30] Foreign Application Priority Data

May 2, 1990 [JP] Japan .................................. PO9-114913
Sep. 11, 1996 [JP] Japan .................................. PO8-240875

[51] Int. Cl.⁶ .................................................. G01C 21/00
[52] U.S. Cl. ........................ 73/178 R; 701/210; 364/449
[58] Field of Search .................................. 73/178 R, 489, 73/490, 491; 701/207, 208, 209, 210, 211, 212; 364/449, 424.01, 443, 521

[56] References Cited

U.S. PATENT DOCUMENTS 4,679,147 7/1987 Tsujii et al. ............................ 73/178 R
4,970,652 11/1990 Nagashima ............................. 364/449

*Primary Examiner*—William Oen
*Attorney, Agent, or Firm*—Young & Thompson

[57] ABSTRACT

A navigation apparatus displays a map so as to support a travel of a movable body. A map information displaying apparatus in the navigation apparatus is provided with: a character data extracting device for extracting character data corresponding to characters from map data corresponding to the map; a map data converting device for converting the map data, which does not include the character data, to a bird's-eye view which is a one-point perspective projection view in which a topography corresponding to the map data is seen from one point in a sky, and outputting bird's-eye view map data indicating the bird's-eye view of the converted map data; a character data converting device for converting the extracted character data to the bird's-eye view, and outputting bird's-eye view character data indicating the bird's-eye view of the converted character data; a synthesizing device for synthesizing the outputted bird's-eye view character data and the outputted bird's-eye view map data corresponding to the bird's-eye view character data with each other, and generating the synthesized bird's-eye view character and map data; and a displaying device for displaying a synthesized bird's-eye view corresponding to the synthesized bird's-eye view character and map data generated by the synthesizing device.

15 Claims, 14 Drawing Sheets

MAP INFORMATION DISPLAYING APPARATUS, NAVIGATION APPARATUS AND PROGRAM STORAGE DEVICE READABLE BY THE NAVIGATION APPARATUS

BACKGROUND OF THE INVENTION

1. Field of the Invention

The present invention relates to a map information displaying apparatus in a navigation apparatus for displaying: a route for a travel of a movable body such as a vehicle or the like; a name of a famous place or building at the vicinity of the route; and the like, together with a map to thereby support the travel of the movable body, and particularly relates to the map information displaying apparatus for displaying a so-called "bird's-eye view" as the map. The present invention also relates to a program storage device readable by the navigation apparatus to execute the program for displaying the bird's-eye view.

2. Description of the Related Art

As a position measuring apparatus for various movable bodies, such as a vehicle, an airplane, a ship and the like, there is a navigation apparatus, which superimposes a position mark (index) indicative of a present position, at which a movable body is presently located, on a point of a map corresponding to the present position and displays it, so as to perform a route guidance to a destination based on the position mark. In an on-vehicle type navigation apparatus among the navigation apparatuses, there are roughly a self-sustained type (i.e. a built-in type) navigation apparatus and a GPS (Global Positioning System) type navigation apparatus.

The self-sustained type navigation apparatus obtains a travel direction and a travel distance of the movable body by using built-in type sensors, such as a velocity sensor, an angular velocity sensor and the like, equipped in the movable body, sequentially integrates them with respect to a standard point so as to calculate a present position, and displays a position mark and a corresponding map on a display screen based on the calculated present position.

The GPS type navigation apparatus receives measurement radio waves from a plurality of GPS satellites launched in the outer space by using GPS receivers, calculates a present position of the movable body by using a three-dimensional survey or a two-dimensional survey based on the received radio waves, and then displays a position mark and a corresponding map on the display screen based on the calculated present position.

There is also a so-called hybrid type navigation apparatus, in which both functions of the self-sustained type and the GPS type are integrated.

Moreover, according to the on-vehicle type navigation apparatus, a route, on which the vehicle is scheduled to proceed, may be superimposed on the map and is displayed together with a famous place or building along the route.

According to the above explained on-vehicle type navigation apparatuses, a user (driver) can grasp the correlation between his present position and the map. Thus, even in an area to which he has never been, he can reach his destination without being misguided.

On the other hand, as for the map display in the on-vehicle type navigation apparatus, there is a map display by using a so-called bird's-eye view, in order to mainly enlarge a range which can be simultaneously displayed and perform a realistic map display.

The map display using the bird's-eye view is intended to display a map, for example, in such a way that a road map is obliquely overlooked from a sky (i.e., a one-point perspective projection view is displayed in which a topography corresponding to a map is seen from one point in the sky). For example, the bird's-eye view is used in a flight simulator and the like.

This bird's-eye view display is schematically explained with reference to FIGS. 13 and 14.

In FIG. 13, a plane M shows a map, and a rectangle abcd shows a display range of a display device for displaying a map. Then, when a view point is set to a position as shown in FIG. 13, a map range which can be seen through the rectangle abcd from this view point is a trapezoid ABCD on the plane M in FIG. 13. Namely, a map having a range much larger than that of the rectangle abcd can be seen from the position of the view point. Therefore, it is the bird's-eye view display to display an image on the display device, as if seeing the trapezoid ABCD of FIG. 13 from the position of the view point of FIG. 13. More concrete explanation is done here with reference to FIG. 14.

FIG. 14 shows an example, in which a road map at the vicinity of a route from a present position of a vehicle to a destination is displayed on the display device by using the bird's-eye view. In FIG. 14, the view point is set in the sky in a direction opposite to the destination with respect to the present position as a standard, and then a direction for the destination is overlooked from the view point. When the view point is set at such a position, an image is displayed in which a reduction scale of the map is gradually increased in conjunction with the approach to the present position from the destination as shown in FIG. 14. Namely, the periphery of the present position is magnified, and the route can be displayed over a wide range up to a place near the destination as compared with a case in which the map is flatly seen.

By use of the above explained bird's-eye view display, it is possible to display at one time the range much wider than that of the case in which the map is flatly displayed, and also possible to perform the realistic map display closer to an actual driving circumstance.

In the aforementioned on-vehicle type navigation apparatus, a name of a famous building and a name of a crossing may be displayed in addition to the road on the map at respective points corresponding to the building and the crossing respectively. However, in a case that these names and the like are displayed when the map is displayed by the bird's-eye view, characters indicative of the names and the like are displayed in a flat shape (in other words, in a two-dimensional display) as shown in FIG. 15.

However, if the characters are displayed in the flat shape on the map displayed by the bird's-eye view, although the map and the name can be displayed without any problem in the area close to the present position, since the reduction scale is lowered in the area farther from the present position, flat-shaped characters located at the places adjacent to each other may be overlapped with each other in the area far away from the present position. Hence, in that case, it is necessary to reduce a number of the characters of the names displayed in the area far away from the present position. This results in a problem that an essential function as the map is lost.

SUMMARY OF THE INVENTION

The present invention is proposed from the viewpoint of the above mentioned problems. It is therefore an object of the present invention to provide a map information displaying apparatus, a navigation apparatus and a program storage device readable by the navigation apparatus, by which the bird's-eye view display can be performed without reducing the number of the displayed characters on the map while the function as the map in the bird's-eye view can be improved, and the visibility can be also improved.

The above object of the present invention can be achieved by a map information displaying apparatus in a navigation apparatus for displaying a map so as to support a travel of a movable body. The map information displaying apparatus is provided with: a character data extracting device for extracting character data corresponding to characters from map data corresponding to the map; a map data converting device for converting the map data, which does not include the character data, to a bird's-eye view which is a one-point perspective projection view in which a topography corresponding to the map data is seen from one point in a sky, and outputting bird's-eye view map data indicating the bird's-eye view of the converted map data; a character data converting device for converting the extracted character data to the bird's-eye view, and outputting bird's-eye view character data indicating the bird's-eye view of the converted character data; a synthesizing device for synthesizing the outputted bird's-eye view character data and the outputted bird's-eye view map data corresponding to the bird's-eye view character data with each other, and generating the synthesized bird's-eye view character and map data; and a displaying device for displaying a synthesized bird's-eye view corresponding to the synthesized bird's-eye view character and map data generated by the synthesizing device.

According to the map information displaying apparatus of the present invention, character data corresponding to characters is extracted from map data corresponding to the map, by the character data extracting device such as a CPU or the like. Then, the map data, which does not include the character data, is converted to the bird's-eye view, and the bird's-eye view map data is outputted by the map data converting device such as a CPU or the like. On the other hand, the extracted character data is converted to the bird's-eye view, and the bird's-eye view character data is outputted by the character data converting device such as a CPU or the like. Then, the outputted bird's-eye view character data and the outputted bird's-eye view map data corresponding to the bird's-eye view character data are synthesized with each other, and the synthesized bird's-eye view character and map data is generated by the synthesizing device such as a graphic controller or the like. Finally, a synthesized bird's-eye view corresponding to the synthesized bird's-eye view character and map data is displayed by the displaying device.

In this manner, after the bird's-eye view conversion is applied to the characters, the characters are synthesized with the map except the characters to which the bird's-eye view conversion is applied, and are displayed. Hence, it is possible to display within the bird's-eye view the characters having the same number as those when the characters as the plan view are synthesized with the map as the plan view. Further, since the map except the characters to which the bird's-eye view conversion is applied and the corresponding characters to which the bird's-eye view conversion is applied are simultaneously displayed, the visibility and the reality on the picture plane can be improved.

As a result, since the number of the displayed characters can be increased in the map display using the bird's-eye view, the essential function as the map is not degraded, while it is possible to display the map with the improved visibility and reality.

In one aspect of the map information displaying apparatus of the present invention, the apparatus is further provided with a calculating device for calculating a set route which is a travel schedule route of the movable body. The character data extracting device extracts the character data from the map data in which the calculated set route is included. And that, the map data converting device converts the map data, which does not include the character data and in which the set route is included, to the bird's-eye view, and outputs the bird's-eye view map data.

According to this aspect, at first, a set route which is a travel schedule route of the movable body is calculated by the calculating device such as a CPU or the like. Then, the character data is extracted from the map data, in which the calculated set route is included, by the character data extracting device. Then, the map data, which does not include the character data and in which the set route is included, is converted to the bird's-eye view, and the bird's-eye view map data is outputted by the map data converting device. Therefore, the map, which includes the set route and to which the bird's-eye view conversion is applied, is displayed together with the characters to which the bird's-eye view conversion is applied. Hence, it is possible to display the topographical condition at the vicinity of the set route with the excellent visibility and the superior reality by using the bird's-eye view.

In this one aspect of the map information displaying apparatus, the character data converting device may convert the character data except the character data corresponding to the set route, among the extracted character data, to the bird's-eye view, and may output the bird's-eye view character data. And that, the synthesizing device may synthesize the outputted bird's-eye view character data, the character data corresponding to the set route and the outputted bird's-eye view map data including the set route with each other, and may generate the synthesized bird's-eye view character and map data.

In this case, the map, which includes the set route and to which the bird's-eye view conversion is applied, is displayed together with the characters to which the bird's-eye view conversion is applied, while the characters corresponding to the set route are displayed without the application of the bird's-eye view conversion thereto. Hence, it is possible to display the topographical condition at the vicinity of the set route with the excellent visibility and the superior reality by using the bird's-eye view, and also possible to display the characters at the vicinity of the set route with the excellent visibility.

In this one aspect of the map information displaying apparatus also, the apparatus may be further provided with a highlight character data converting device for converting the character data corresponding to the set route, to highlight character data, which is to highlight characters corresponding to the character data. The character data converting device may convert the converted highlight character data to the bird's-eye view, and may output bird's-eye view highlight character data indicating the bird's-eye view of the converted highlight character data. And that, the synthesizing device may synthesize the outputted bird's-eye view highlight character data, the outputted bird's-eye view character data and the outputted bird's-eye view map data including the set route with each other, and may generate the synthesized bird's-eye view character and map data.

In this case, the character data corresponding to the set route is converted to highlight character data, which is to highlight characters corresponding to the character data, by the highlight character data converting device such as a CPU or the like. Therefore, since the bird's-eye view conversion is applied to the characters, while the characters at the vicinity of the set route are highlighted, it is possible to display the names of places, buildings and the like, especially at the vicinity of the set route with the excellent visibility.

In this one aspect of the map information displaying apparatus also, the character data corresponding to the set route may correspond to a guidance point, which is set on the set route and is used to guide the movable body.

In this case, since the character data corresponding to the set route corresponds to the guidance point set on the set route, it is possible to display the characters corresponding to the guidance point with the excellent visibility.

The above object of the present invention can be also achieved by a navigation apparatus for displaying a map so as to support a travel of a movable body. The navigation apparatus is provided with: a character data extracting device for extracting character data corresponding to characters from map data corresponding to the map; a map data converting device for converting the map data, which does not include the character data, to a bird's-eye view which is a one-point perspective projection view in which a topography corresponding to the map data is seen from one point in a sky, and outputting bird's-eye view map data indicating the bird's-eye view of the converted map data; a character data converting device for converting the extracted character data to the bird's-eye view, and outputting bird's-eye view character data indicating the bird's-eye view of the converted character data; a synthesizing device for synthesizing the outputted bird's eye view character data and the outputted bird's-eye view map data corresponding to the bird's-eye view character data with each other, and generating the synthesized bird's-eye view character and map data; a detecting device for detecting a present position and a travel direction of the movable body; a superimposing device for superimposing an index indicating the detected present position and travel direction onto the synthesized bird's-eye view character and map data generated by the synthesizing device, to which the detected present position is included; and a displaying device for displaying a synthesized bird's-eye view corresponding to the synthesized bird's-eye view character and map data on which the index is superimposed.

According to the navigation apparatus of the present invention, character data corresponding to characters is extracted from map data corresponding to the map, by the character data extracting device. Then, the map data, which does not include the character data, is converted to the bird's-eye view, and the bird's-eye view map data is outputted by the map data converting device. On the other hand, the extracted character data is converted to the bird's-eye view, and the bird's-eye view character data is outputted by the character data converting device. Then, the outputted bird's-eye view character data and the outputted bird's-eye view map data corresponding to the bird's-eye view character data are synthesized with each other, and the synthesized bird's-eye view character and map data is generated by the synthesizing device. On the other hand, a present position and a travel direction of the movable body are detected by the detecting device such as, an angular velocity sensor, a travel distance sensor, a GPS receiver or the like. Then, the index indicating the detected present position and travel direction is superimposed onto the synthesized bird's-eye view character and map data, to which the detected present position is included, by the superimposing device. Finally, a synthesized bird's-eye view corresponding to the synthesized bird's-eye view character and map data, on which the index is superimposed, is displayed by the displaying device.

In this manner, after the bird's-eye view conversion is applied to the characters, the characters are synthesized with the map except the characters to which the bird's-eye view conversion is applied, and are displayed. Hence, it is possible to display within the bird's-eye view the characters having the same number as those when the characters as the plan view are synthesized with the map as the plan view. Further, since the map except the characters to which the bird's eye view conversion is applied and the corresponding characters to which the bird's-eye view conversion is applied are simultaneously displayed, the visibility and the reality on the picture plane can be improved.

As a result, since the number of the displayed characters can be increased in the map display using the bird's-eye view, the essential function as the map is not degraded, while it is possible to display the map with the improved visibility and reality.

In one aspect of the navigation apparatus of the present invention, the apparatus is further provided with a calculating device for calculating a set route which is a travel schedule route of the movable body. The character data extracting device extracts the character data from the map data in which the calculated set route is included. And that, the map data converting device converts the map data, which does not include the character data and in which the set route is included, to the bird's-eye view, and outputs the bird's-eye view map data.

According to this aspect, at first, the set route is calculated by the calculating device. Then, the character data is extracted from the map data, in which the calculated set route is included, by the character data extracting device. Then, the map data, which does not include the character data and in which the set route is included, is converted to the bird's-eye view, and the bird's-eye view map data is outputted by the map data converting device. Therefore, the map, which includes the set route and to which the bird's-eye view conversion is applied, is displayed together with the characters to which the bird's-eye view conversion is applied. Hence, it is possible to display the topographical condition at the vicinity of the set route with the excellent visibility and the superior reality by using the bird's-eye view.

In this one aspect of the navigation apparatus, the character data converting device may convert the character data except the character data corresponding to the set route, among the extracted character data, to the bird's-eye view, and may output the bird's-eye view character data. And that, the synthesizing device may synthesize the outputted bird's-eye view character data, the character data corresponding to the set route and the outputted bird's-eye view map data including the set route with each other, and may generate the synthesized bird's-eye view character and map data.

In this case, the map, which includes the set route and to which the bird's-eye view conversion is applied, is displayed together with the characters to which the bird's-eye view conversion is applied, while the characters corresponding to the set route are displayed without the application of the bird's-eye view conversion thereto. Hence, it is possible to display the topographical condition at the vicinity of the set route with the excellent visibility and the superior reality by using the bird's-eye view, and also possible to display the characters at the vicinity of the set route with the excellent visibility.

In this one aspect of the navigation apparatus also, the apparatus may be further provided with a highlight character data converting device for converting the character data corresponding to the set route, to highlight character data, which is to highlight characters corresponding to the character data. The character data converting device may convert the converted highlight character data to the bird's eye view, and may output bird's-eye view highlight character data indicating the bird's eye view of the converted highlight character data. And that, the synthesizing device may synthesize the outputted bird's-eye view highlight character data, the outputted bird's-eye view character data and the outputted bird's-eye view map data including the set route with each other, and may generate the synthesized bird's-eye view character and map data.

In this case, the character data corresponding to the set route is converted to highlight character data by the highlight character data converting device. Therefore, since the bird's-eye view conversion is applied to the characters, while the characters at the vicinity of the set route are highlighted, it is possible to display the names of places, buildings and the like, especially at the vicinity of the set route with the excellent visibility.

In this one aspect of the navigation apparatus also, the character data corresponding to the set route may correspond to a guidance point, which is set on the set route and is used to guide the movable body.

In this case, since the character data corresponding to the set route corresponds to the guidance point, it is possible to display the characters corresponding to the guidance point with the excellent visibility.

The above object of the present invention can be also achieved by a program storage device readable by a navigation apparatus for displaying a map so as to support a travel of a movable body, tangibly embodying a program of instructions executable by the navigation apparatus to perform method processes for displaying the map. The method processes are provided with: extracting character data corresponding to characters from map data corresponding to the map; converting the map data, which does not include the character data, to a bird's-eye view which is a one-point perspective projection view in which a topography corresponding to the map data is seen from one point in a sky, and outputting bird's-eye view map data indicating the bird's-eye view of the converted map data; converting the extracted character data to the bird's-eye view, and outputting bird's-eye view character data indicating the bird's-eye view of the converted character data; synthesizing the outputted bird's eye view character data and the outputted bird's-eye view map data corresponding to the bird's-eye view character data with each other, and generating the synthesized bird's-eye view character and map data; and displaying a synthesized bird's-eye view corresponding to the synthesized bird's-eye view character and map data generated by the synthesizing process.

According to the program storage device, such as a ROM, a CD-ROM, a DVD-ROM, a floppy disk or the like, of the present invention, the above described navigation apparatus of the present invention can be realized as the navigation apparatus reads the program of instructions from the program storage device, and executes the read program.

In one aspect of the program storage device of the present invention, the method processes are further provided with calculating a set route which is a travel schedule route of the movable body. The character data extracting process extracts the character data from the map data in which the calculated set route is included. And that, the map data converting process converts the map data, which does not include the character data and in which the set route is included, to the bird's-eye view, and outputs the bird's-eye view map data.

In this one aspect of the program storage device, the character data converting process may convert the character data except the character data corresponding to the set route, among the extracted character data, to the bird's-eye view, and may output the bird's-eye view character data. And that, the synthesizing process may synthesize the outputted bird's eye view character data, the character data corresponding to the set route and the outputted bird's-eye view map data including the set route with each other, and may generate the synthesized bird's-eye view character and map data.

In this one aspect of the program storage device also, the method processes may be further provided with converting the character data corresponding to the set route, to highlight character data, which is to highlight characters corresponding to the character data. The character data converting process may convert the converted highlight character data to the bird's-eye view, and may output bird's-eye view highlight character data indicating the bird's-eye view of the converted highlight character data. And that, the synthesizing process may synthesize the outputted bird's-eye view highlight character data, the outputted bird's eye view character data and the outputted bird's-eye view map data including the set route with each other, and may generate the synthesized bird's-eye view character and map data.

In this one aspect of the program storage device also, the character data corresponding to the set route may correspond to a guidance point, which is set on the set route and is used to guide the movable body.

According to the above described aspects of the program storage device of the present invention, respective one of the aspects of the above described navigation apparatus of the present invention can be realized.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Next, a preferred embodiment of the present invention is explained with reference to the drawings. A case in which the present invention is applied to an on-vehicle type navigation apparatus in an automobile or the like is explained in the embodiment described below.

(I) Apparatus Configuration

At first, a whole configuration of an on-vehicle type navigation apparatus of the embodiment is explained with reference to FIG. 1.

Figure 1:
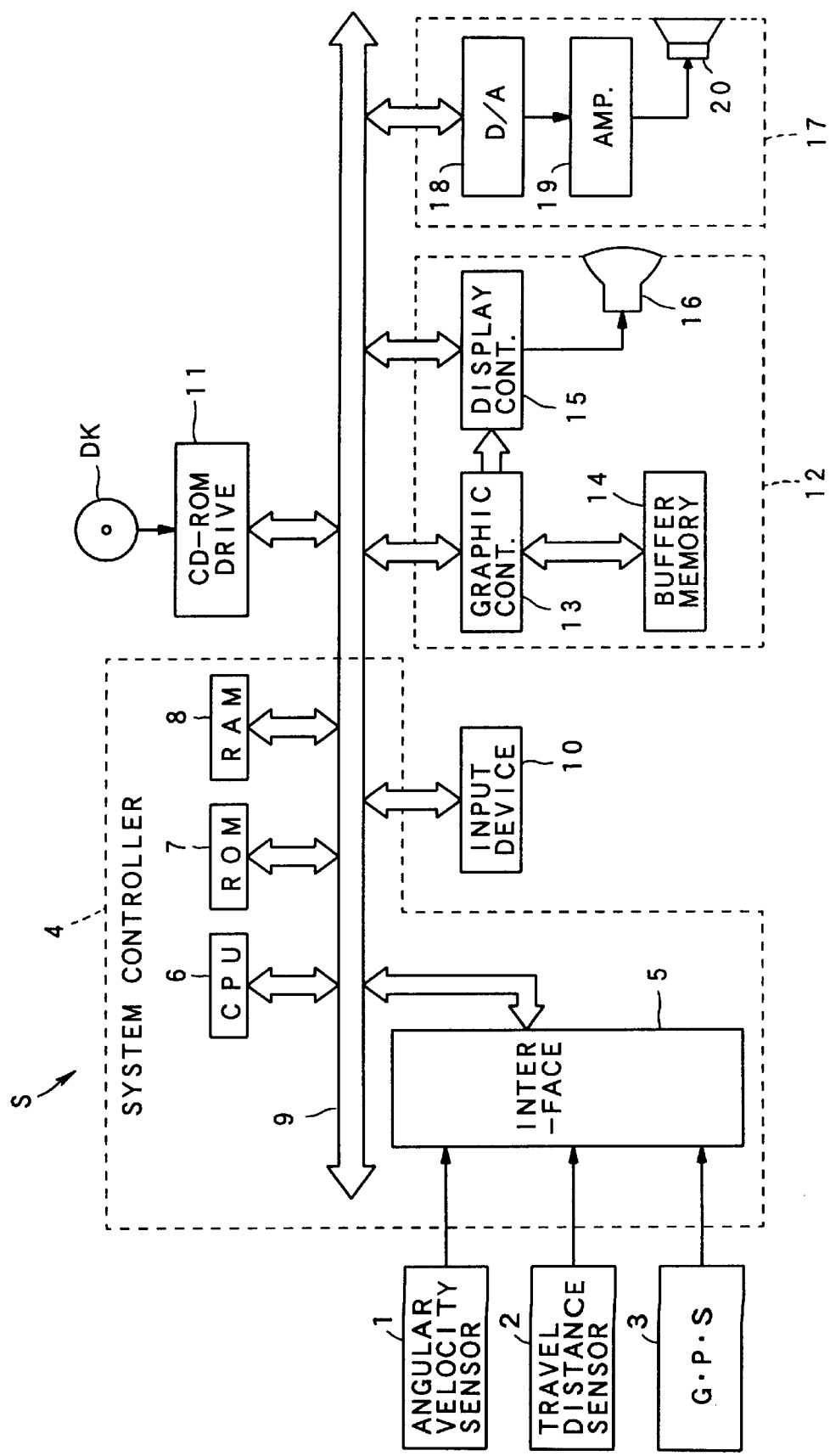
FIG. 1 is a block diagram showing a schematic configuration of an on-vehicle type navigation apparatus as an embodiment of the present invention.

As shown in FIG. 1, an on-vehicle type navigation apparatus S according to the embodiment is provided with: an angular velocity sensor 1 for detecting an angular velocity at a time of direction change of a self-vehicle and then outputting angular velocity data and relative azimuth data; a travel distance sensor 2 for counting a pulse number in a pulse signal outputted in conjunction with a wheel rotation to thereby calculate a pulse number per wheel rotation and then outputting travel distance data based on the pulse number per wheel rotation; a GPS receiver 3 for receiving radio waves from GPS satellites and then outputting GPS measurement data and further outputting absolute azimuth data in a travel direction of the self-vehicle; a system controller 4 for controlling the navigation apparatus S as a whole, based on the relative azimuth data, the angular velocity data, the travel distance data, the GPS measurement data and the absolute azimuth data; an input device 10, such as a remote controller or the like, for inputting various data; a CD-ROM drive 11 for reading out and outputting various data, such as road data or the like, which includes a number of lanes of a road, a width of a road or the like, and control programs corresponding to respective examples in the embodiment described later, from a CD-ROM disk DK, under the control of the system controller 4; a display unit 12 for displaying various display data under the control of the system controller 4; and an audio reproducing unit 17 for reproducing and outputting various audio data under the control of the system controller 4.

The system controller 4 is provided with: an interface 5 for performing an interface operation to the external sensors, such as the GPS receiver 3 and the like; a CPU 6 for controlling the whole system controller 4; a ROM (Read Only Memory) 7 in which control programs to control the system controller 4 and the like are stored; and a RAM (Random Access Memory) 8, which has a non-volatile memory, for readably storing various data, such as route data and the like, which are set in advance by a user through the input device 10. The system controller 4 is connected through a bus line 9 to the input device 10, the CD-ROM drive 11, the display unit 12 and the audio reproducing unit 17.

The display unit 12 is provided with: a graphic controller 13, as one example of a synthesizing device and a superimposing device, for controlling the whole display unit 12 based on the control data sent from the CPU 6 through the bus line 9; a buffer memory 14, which may be constituted by a memory such as a VRAM (Video RAM) or the like, for temporarily storing image information which can be instantly displayed; a display controller 15 for display-controlling a display device 16 on the basis of image data outputted by the graphic controller 13; and the display device 16 such as a liquid crystal display device, a CRT (Cathode Ray Tube) display device or the like,.

The audio reproducing unit 17 is provided with: a D/A (Digital to Analog) converter 18 for D/A converting digital audio data sent through the bus line 9 from the CD-ROM drive 11 or the RAM 8; an amplifier (AMP) 19 for amplifying an analog audio signal outputted by the D/A converter 18; and a speaker 20 for converting the amplified analog audio signal into an audio sound to thereby output it.

In the above mentioned configuration, the CPU 6 contained in the system controller 4 functions as one example of a character data extracting device, one example of a map data converting device, one example of a character data converting device, one example of a calculating device and one example of a highlight character data converting device according to the control program as described later. Each of the angular velocity sensor 1, the travel distance sensor 2 and the GPS receiver 3 functions as one example of the detecting device.

Next, an operation of the on vehicle type navigation apparatus S of the present embodiment is explained for each examples.

Operations shown in flowcharts of the respective examples described below are mainly performed by the CPU 6 or the graphic controller 13, and executed as one portion of a main navigation program of controlling the on-vehicle type navigation apparatus S as a whole to thereby perform the navigation operation. Thus, when a predetermined command operation is performed by the input device 10 during the execution of the main navigation program, the operations shown in the flowcharts of the respective examples are performed.

In this embodiment, the control program corresponding to any one of flow charts of FIGS. 2, 4 to 6, 8, 10 and 12A explained hereinbelow is stored in the ROM 7 or the CD-ROM DK in advance, and is read out therefrom. Namely, the ROM 7 or the CD ROM DK as one example of the program storage device, tangibly embodies a program of instructions executable by the navigation apparatus S to perform method processes for displaying the bird's-eye view map on the display device 16. The control program read from the CD-ROM DK may be stored in the RAM 8 in advance, so as to speedily execute the program. Alternatively, the control program may be received through a wire or wireless communication line by use of a modem of the navigation apparatus S and is stored into the RAM 8.

Programs corresponding to the flowcharts in the respective examples described below are stored in advance in the CD-ROM disk DK as the control programs, and read out through the CD-ROM drive 11 as the occasion demands.

(II) Example of Bird's-Eye View Display Process

Figure 2:
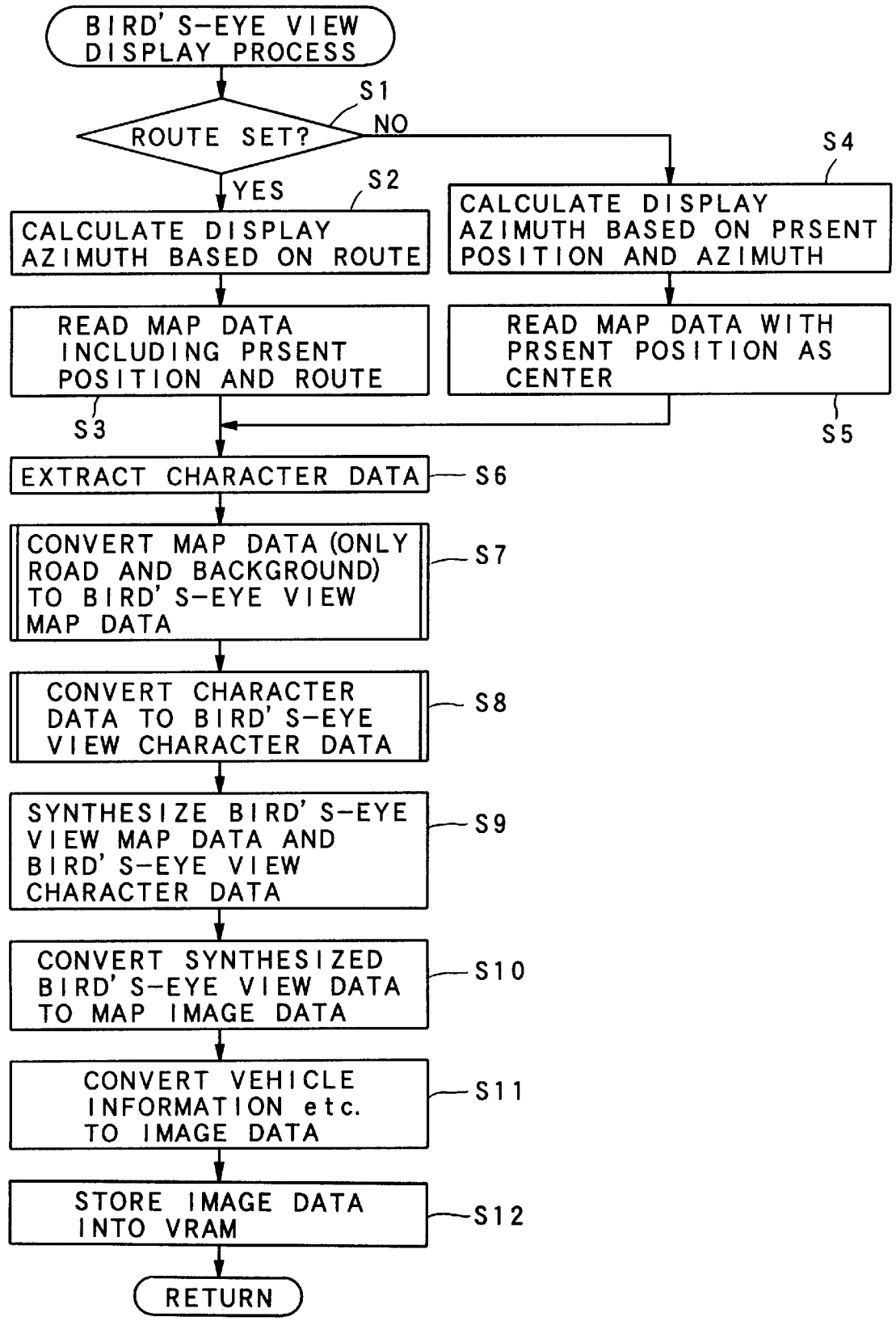
FIG. 2 is a flowchart showing a whole operation of a bird's-eye view display process in the embodiment.

At first, a process in a main routine, which indicates a whole operation of the bird's-eye view display process, is explained with reference to the flowchart of FIG. 2. In FIG. 2, processes at steps S1 to S8 are performed in the CPU 6, and operations at steps S9 to S12 are performed in the graphic controller 13.

The process shown in FIG. 2 is started when a command to display a map by the bird's-eye view is inputted by the input device 10. Then, the operational flow proceeds from a predetermined main navigation program to the process shown in FIG. 2.

When the operational flow proceeds from the predetermined main navigation program to the process shown in FIG. 2 based on the command for the bird's-eye view display, at first, it is judged whether or not a set route as a passing schedule route from a present position to a destination is set and stored in the RAM 8 in advance (Step S1). If the set route is set in advance (Step S1; YES), an azimuth for a view line in a bird's-eye view conversion (hereafter, it is referred to as a "display azimuth") is calculated in line with the azimuth of the set route so that the set route far away from the present position (as well as the set route near the present position) can be included and displayed in the display (Step S2). Next, by considering the calculated display azimuth and the present position of the self-vehicle, map data including the present position (including character data such as names of places, buildings and the like as well as the map) in the direction indicated by the calculated display azimuth is read out through the CD-ROM drive 11 from the CD-ROM disk DK and is temporarily stored in the RAM 8 (Step S3).

On the other hand, if the set route is not set in advance (Step S1; NO), by considering the present position of the vehicle and a present travel direction, the display azimuth is calculated on the basis of the present position and the present travel direction, which is assumed to be the direction to the destination (Step S4). Next, map data including the present position (including character data such as names of places, buildings and the like as well as the map) in the direction indicated by the calculated display azimuth (i.e. the travel direction) is read out through the CD-ROM drive 11 from the CD-ROM disk DK and is temporarily stored in the RAM 8 (Step S5).

When the map data necessary for the pertinent bird's eye view display is stored in the RAM 8 (Step S3 or S5), the character data included in the map data (which include: characters themselves indicative of names of places, famous facilities, roads and the like; figures indicative of map symbols for a school, a police, a factory and the like; figures indicative of indexes (landmarks) representing a convenience store, a gas station and the like; and so on) is extracted from the stored map data (Step S6). Then, a one point perspective projection conversion is performed by seeing the map data after the character data is extracted (in which only a road map, a background and the like are included) from one point of the sky over a periphery of the present position of the self-vehicle (hereafter, it is simply referred to as a "bird's-eye view conversion"). Then, the bird's-eye view map data is prepared and stored temporarily into the RAM 8 (Step S7). The detailed process at the step S7 is described later.

Next, the bird's-eye view conversion is applied to the character data extracted at the step S6 by using a conversion method same as that at the step S7, and then the bird's-eye view character data is prepared and stored temporarily into the RAM 8 (Step S8). The detailed process at the step S8 is also described later.

After the process at the step S8 is ended, the stored bird's-eye view map data and the bird's-eye view character data are synthesized with each other (Step S9), and then one sheet of map image data to be displayed on the display device 16 is prepared (Step S10). Next, (i) a present position index, which corresponds to the present position of the self-vehicle calculated by the CPU 6, and (ii) an image, which corresponds to vehicle information such as a distance to the destination on the set route, additional information or the like, are converted into image data (Step S11). Finally, these map image data (prepared at the Step S10) and image data (prepared at the Step S11) are temporarily stored into the buffer memory 14. Then, the operational flow returns to the original main navigation program. After that, these map image data and image data are read out from the buffer memory 14 at a timing controlled by the display controller 15, and then the corresponding bird's-eye view map is displayed on the display device 16.

(III) Detailed Process of Generating Bird's-Eye View Map Data

Next, the detailed process of generating the bird's-eye view map data at the step S7 is explained with reference to FIGS. 3A, 3B and 4.

At first, the bird's-eye view (i.e. one-point perspective projection view) itself is explained in detail with reference to FIGS. 3A and 3B.

As shown in FIGS. 3A and 3B, the bird's-eye view is an image obtained by projecting a picture, which is obtained when an area ABCD of the map expressed with respect to a (X, Y) plane in (X, Y, Z) coordinate axes as a standard is overlooked at a depression angle $\theta$ from a view point E (X0, Y0, Z0) to a reference point R (Xb, Yb, 0) onto the (X, Y) plane, onto a view plane G arranged vertically to a view line direction. At this time, the view line direction from the view point E is assumed to have an angle $\alpha$ i.e. a display azimuth $\alpha$ with respect to an X axis on the XY plane as a standard line. Namely, the angle $\alpha$ is the display azimuth $\alpha$ calculated at the step S2 or S4.

Moreover, a distance between the view point E and the view plane G is assumed to be a distance Vd. Then, a central line (longitudinal line) on the view plane G is assumed to be a standard line, and a predetermined point Q on this standard line is assumed to be a standard point for the one-point perspective projection. Namely, the standard point Q is a point located on a straight line through which the view point E and the reference point R are connected to each other when considering it for the XY plane as the map.

Next, the detailed process of generating the bird's-eye view map data performed at the step S7 is explained with reference to FIGS. 3A and 3B and the flowchart in FIG. 4. In the process of generating the bird's-eye view map data, there are one method of assuming a present position PO of the self-vehicle as a position of a leg of a vertical line drawn from the view point E to the map ((X, Y) plane) and another method of assuming the present position P0 as the standard point Q. However, there is no basic difference between these methods. For an evident explanation, a case is explained in which the present position P0 is the standard point Q and further the standard point Q coincides with the reference point R.

Figure 4:
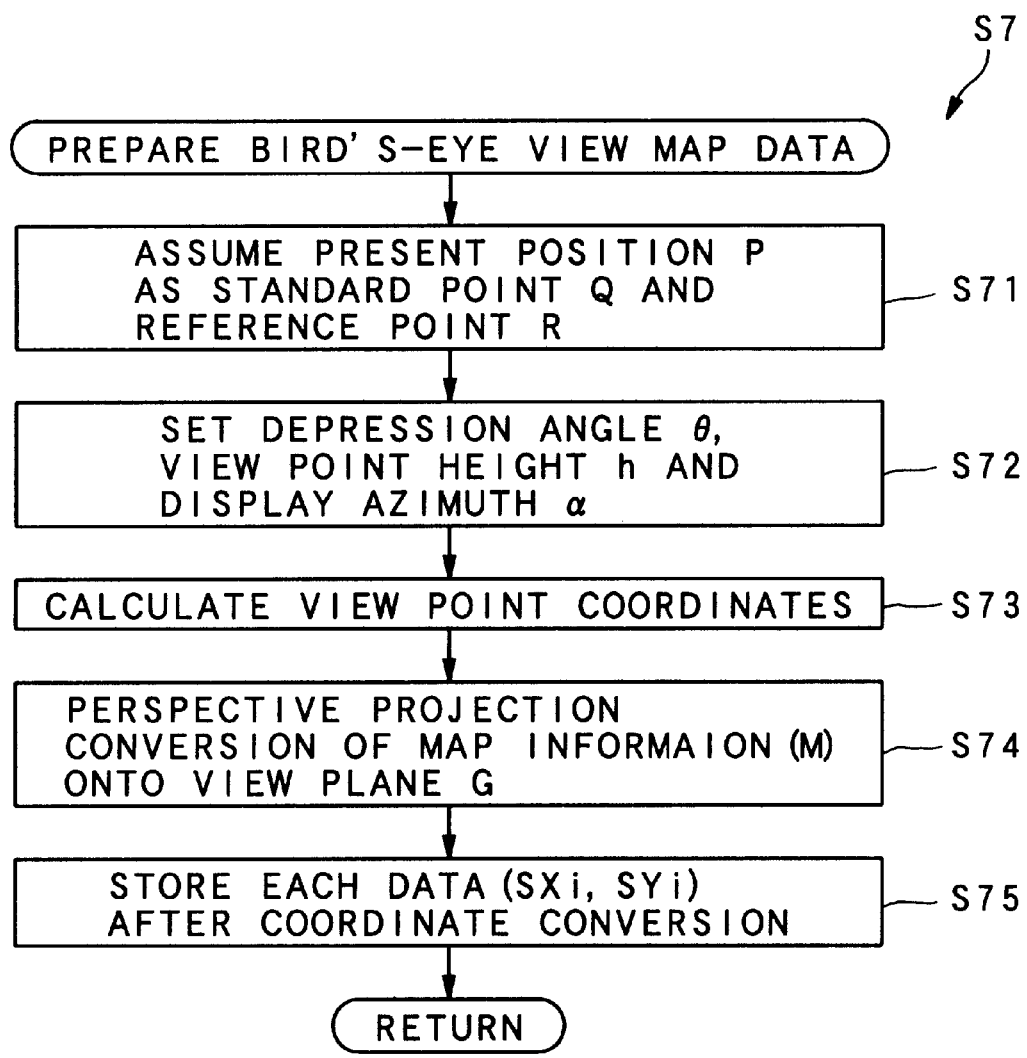
FIG. 4 is a flowchart showing a process of the bird's-eye view conversion.

As shown in FIG. 4, in the step S7 of FIG. 2, at first, the present position P0 is set as the standard point Q and the reference point R (Step S71). Next, when a height h of the view point E is inputted from the input device 10, the depression angle $\theta$ is calculated on the basis of the height h, and further the dislay azimuth $\alpha$ is read out (Step S72). Then, coordinates of the view point E (X0, Y0, Z0) are calculated by using equations described below, with respect to the reference point R (Xb, Yb, 0) as a standard (Step S73).

$$X0 = Xb - h \times \cos \alpha / \tan \theta$$

$$Y0 = Yb - h \times \sin \alpha / \tan \theta$$

$$Z0 = h$$

Next, the bird's-eye view conversion is applied to the map data on the basis of the calculated coordinates of the view point E (Step S74). At the step S74, when arbitrary point M (Mx, My, Mz) on the XY plain is coordinate-converted to a corresponding point S (Sx, Sy) on the view plane G, a relation equation (determinant) described below is used.

When:

$$\begin{pmatrix} Ex \\ Ey \\ Ez \\ 1 \end{pmatrix} = \begin{pmatrix} 1 & 0 & 0 & 0 \\ 0 & \sin\theta & \cos\theta & 0 \\ 0 & -\cos\theta & \sin\theta & 0 \\ 0 & 0 & 0 & 1 \end{pmatrix} \begin{pmatrix} \sin\alpha & -\cos\alpha & 0 & 0 \\ \cos\alpha & \sin\alpha & 0 & 0 \\ 0 & 0 & 1 & 0 \\ 0 & 0 & 0 & 1 \end{pmatrix}$$

$$\begin{pmatrix} 1 & 0 & 0 & -X0 \\ 0 & 1 & 0 & -Y0 \\ 0 & 0 & 1 & -Z0 \\ 0 & 0 & 0 & 1 \end{pmatrix} \begin{pmatrix} Mx \\ My \\ Mz \\ 1 \end{pmatrix}$$

Then:

$$Sx = Ex \times Vd / -Ez$$

$$Sy = Ey \times Vd / -Ez$$

$$Sz = 0$$

Incidentally, in the above mentioned relation equation (determinant), "Ex", "Ey" and "Ez" are coordinate values at the point M in a three-dimension display seen from the view point E as the start point (in which a depth from the view point E as a start point is to the considered). After the coordinates at the point M are converted to the coordinates represented by Ex, Ey and Ez, the conversion to a point S on the view plain G is performed by using these coordinates.

When the point S (Sx, Sy) on the view plain G as for one point M is calculated (since Sz is 0, it is omitted), the coordinate conversions to the points S on the view plain G are performed as for all of the points M on the map data to be coordinate-converted in the same manner. After the coordinate-conversions for all of the points M are completed, they are stored into the RAM 8 (Step S75) and then the operational flow proceeds to the step S8 in FIG. 2. The bird's-eye view conversion of the map data in which the character data is not included is ended by the above mentioned operations.

Next, the detailed process of generating the bird's-eye view character data performed at the step S8 is explained for each example.

(IV) First Example of Detailed Process of Generating Bird's-Eye View Character Data At first, a first example of the detailed process of generating the bird's-eye view character data (Step S8) is explained with reference to a flowchart of FIG. 5. In the first example described below, the bird's-eye view conversion process in case that the character data is stored in the CD-ROM disk DK as a so-called "vector font" is explained. Here, the vector font implies a font in which each straight line constituting one character or symbol is represented by a start point coordinate indicative of a start point of the straight line and an end point coordinate indicative of an end point of the straight line. More concretely, for example, a vector font indicating a Chinese character [木] contains a start point coordinate and an end point coordinate indicative of each of the lateral lines and the longitudinal lines, as relative coordinates with respect to a predetermined standard point. Incidentally, a slant line and a curved line in the character or the like are represented as a combination of the lateral line and the longitudinal line, so that a vector font indicative of the slant line or curved line is constituted by including a start point coordinate and an end point coordinate of the lateral line or longitudinal line.

Figure 5:
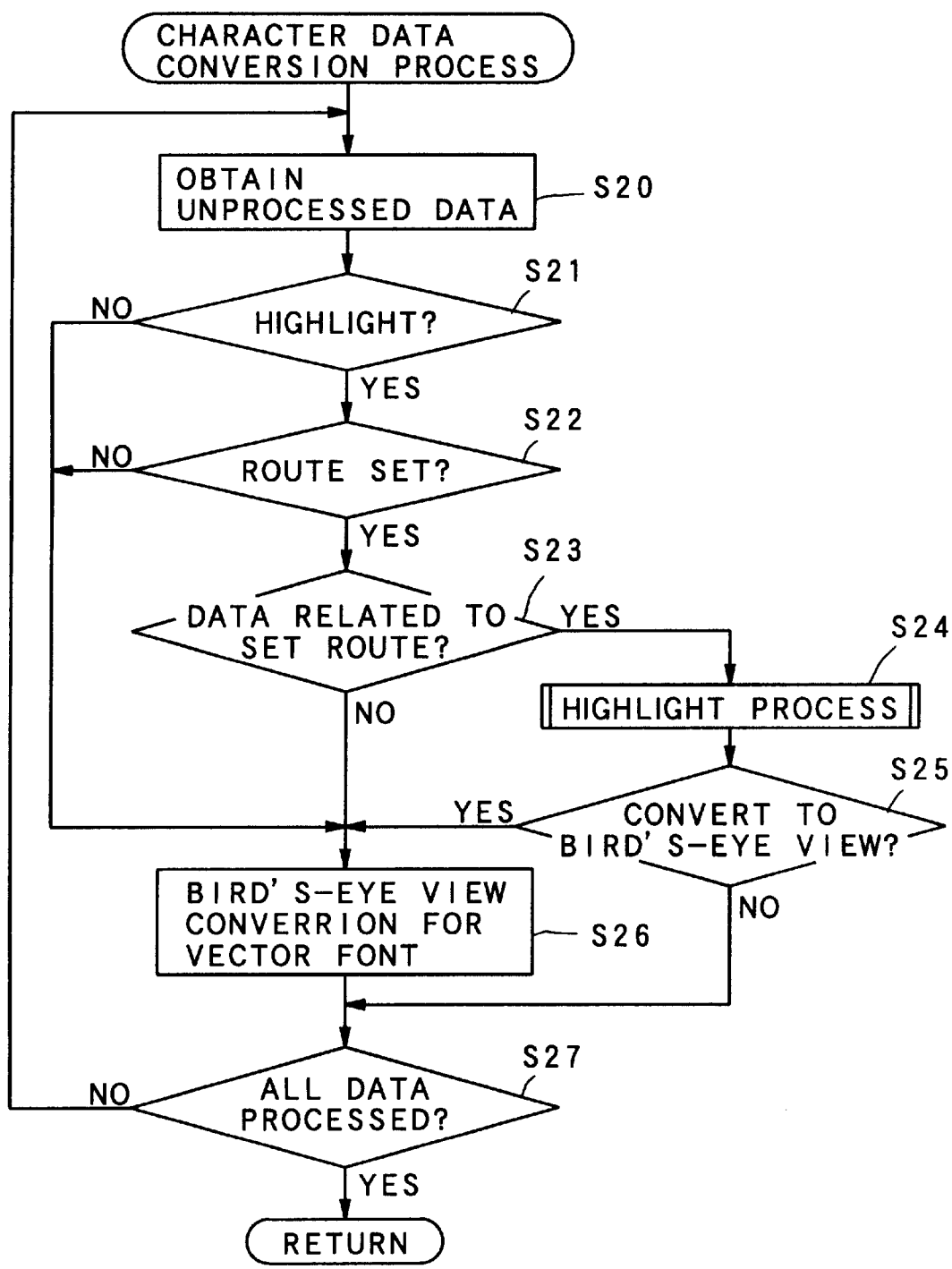
FIG. 5 is a flowchart (I) showing a first example of a process of generating bird's-eye view character data in the embodiment.

As shown in FIG. 5, in the first example of generating the bird's-eye view character data, at first, one unprocessed data is obtained from among the extracted character data (Step S20). Then, it is judged in accordance with a user's command from the input device 10 whether or not the character data is highlighted on the display 20 (Step S21). The highlight at the step S21 implies an operation of highlighting and displaying one character data on the display device 16 so as to discriminate it from another character data. In this embodiment, the highlight is performed for the character data related to the set route (for example, name data indicative of a crossing on the set route, name data indicative of an object servicing as a target on the set route or the like).

If a name highlight is performed in the judgment at the step S21 (Step S21; YES), it is judged whether or not the set route is already set and stored in the RAM 8 (Step S22). If the set route is set and stored (Step S22; YES), it is judged whether or not the character data obtained at the step S20 is the character data related to the set route (Step S23).

If the character data is related to the set route in the judgment at the step S23 (Step S23; YES), a predetermined highlight process is applied to the character data (Step S24). For example, a process of converting the character data to be highlighted to a different color from another character data, or a process of rimming the character data to be highlighted is performed in the highlight process at the step S24.

Now, the process performed at the step S24 is explained in more detail with reference to FIG. 6.

Figure 6:
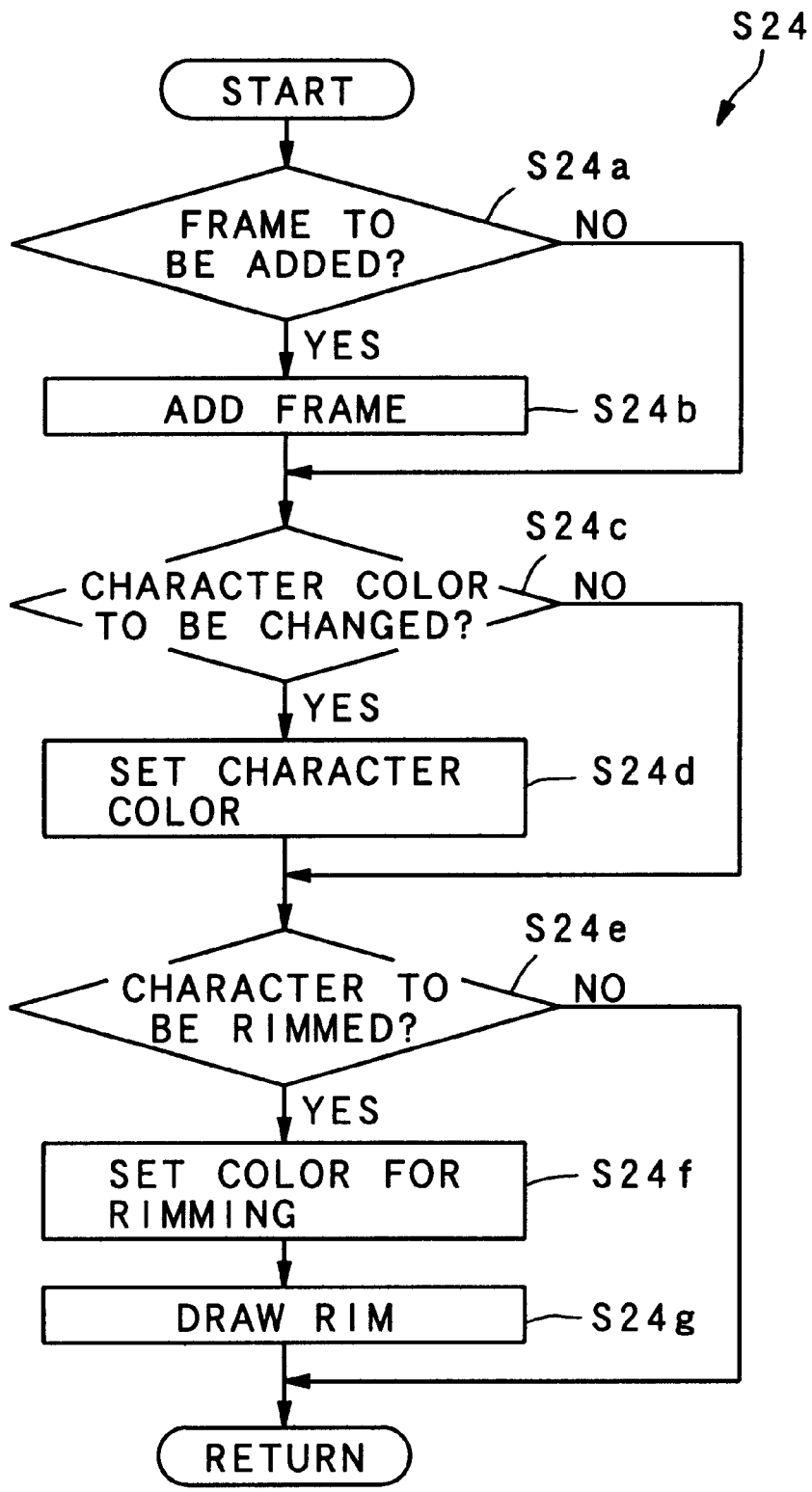
FIG. 6 is a flowchart showing a concrete example of a highlight process in the embodiment.

As shown in FIG. 6, in the step S24, at first, it is judged whether or not a frame is to be added to the character data to be highlighted (Step S24a). If the frame is not to be added (Step S24a; NO), the operational flow proceeds to a step S24c as it is. If the frame is to be added (Step S24a; YES), the frame is added to the character data (Step S24b). Here, the frame implies a framework displayed so as to encompass the character to be highlighted.

After the frame is added (Step S24b) or if the frame is not to be added (Step S24a; NO), it is judged whether or not a color for the character data to be highlighted is set to be different from that for another character data not to be highlighted (Step S24c). If it is not set to be different (Step S24c; NO), the operational flow proceeds to a step S24e as it is. If it is set to be different (Step S24c; YES), a color for drawing and displaying the characters is set (Step S24d).

Next, it is judged whether or not the character data to be highlighted is to be displayed by rimming it (Step S24e). If it is not to be displayed by rimming it (Step S24e; NO), the operational flow proceeds to a step S25 (in FIG. 5) as it is. If it is to be displayed by rimming it (Step S24e; YES), a color for rimming is set (Step S24f), and the rim is drawn (Step S24g). Then, the operational flow proceeds to the step S25.

According to the above mentioned process in FIG. 6, the characters to which the respective highlight processes are sequentially applied are to be displayed.

In FIG. 5 again, after the highlight process is ended (Step S24), it is judged in accordance with the user's command from the input device 10 whether or not the bird's-eye view conversion is to be applied to the highlighted character data (Step S25). If the bird's-eye view conversion is to be applied (Step S25; YES), the bird's-eye view conversion using the aforementioned relation equation for the conversion (i.e., the bird's-eye view conversion applied to coordinates at start points and end points in respective line segments constituting the character data as the vector font) is applied to the character data to which the bird's-eye view conversion is to be applied, in the same manner as the process of generating the bird's-eye view map data shown in FIGS. 3 and 4. Then, the character data is converted for the bird's-eye view display and stored in the RAM 8 (Step S26).

If the name highlight is not applied to any character data at the step S21 (Step S21; NO), the operational flow proceeds to a step S26 so as to similarly apply the bird's-eye view conversion to all of the character data.

If the set route is not set at the step S22 even in a case that the name highlight is to be applied (Step S22; NO), since there is no character to be highlighted, the operational flow proceeds to the step S26 so as to similarly apply the bird's-eye view conversion to all of the character data.

Moreover, if the obtained character data is not related to the set route at the step S23 even in a case that the set route is set (Step S23; NO), the operational flow proceeds to the step S26 so as to apply the bird's-eye view conversion as it is.

After the application of the bird's-eye view conversion to the targeted character data is completed (Step S26), it is judged whether or not the bird's-eye view process is completed for all of the character data, which is stored in the RAM 8 and to which the bird's-eye view conversion is to be applied (Step S27). If it is completed (Step S27; YES), the operational flow proceeds to the process at the step S9 (FIG. 2) as it is.

At the step S25, if such a highlight process is to be applied that the bird's-eye view conversion is not applied to the character data to be highlighted while the bird's eye view conversion is applied to another character data, as one type of the highlight process, the bird's-eye view conversion is not applied to this character data to be highlighted (Step S25; NO), and then the operational flow proceeds to the step S27. At this time, the process at the step S24 is not applied to the character data, to which the highlight process of displaying it without applying the bird's-eye view conversion is to be applied.

On the other hand, if the application of the bird's-eye view process is not completed for all of the character data in the judgment at the step S27 (Step S27; NO), the operational flow returns to the step S20 so as to obtain the character data for which the process is not applied yet. The application of the bird's-eye view conversion to the character data is completed by the above mentioned operations.

Figure 7:
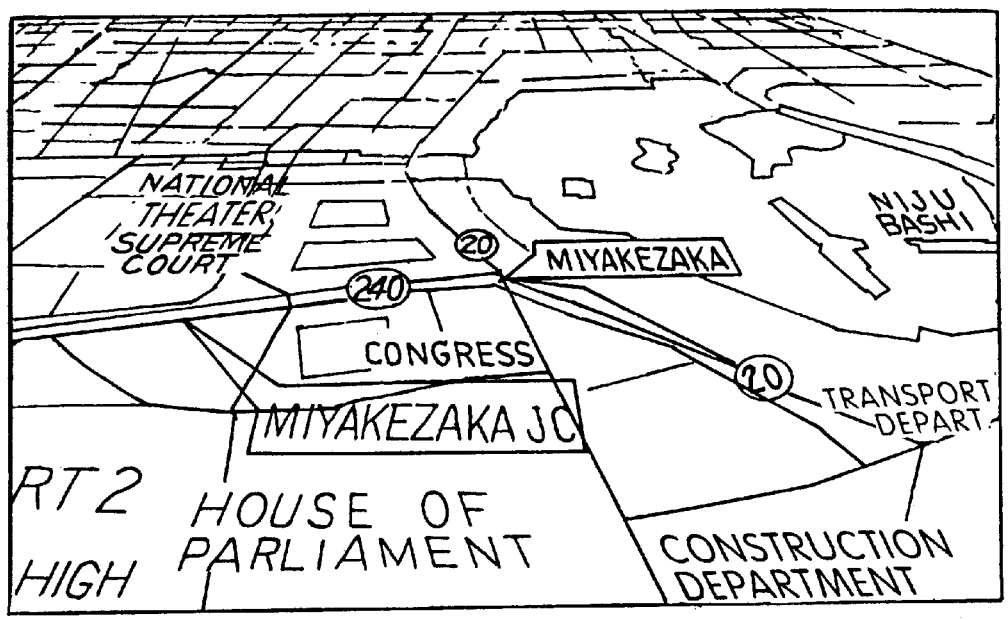
FIG. 7 is a diagram (I) showing one example of an executed result of the bird's-eye view display process in the embodiment.

When the bird's-eye view process, which is shown in FIG. 2 and includes the processes at the steps S7 and S8 (the first example of generating the bird's-eye view character data), is ended as mentioned above, a display image including the characterdata, suchas the names of places, buildings and the like, together with the road diagram and the background, is displayed by using the bird's-eye view on the display device 16 as a result, for example, as shown in FIG. 7. Then, if the name of the place and the like to be highlighted is contained in a range shown in FIG. 7 (for example, if the name of the place "MIYAKEZAKAJC" is to be highlighted in FIG. 7), the highlight process, such as the addition of the frame, the change of the color, the rim or the like is applied to the character data corresponding to this name of the place by the processes shown in FIG. 6. Then, it is displayed on the display device 16.

The highlight process at the step S24 may be applied to a guidance point on the set route (e.g., a route point on the set route at which a voice guidance is to be performed, and more concretely, a route point where a caution should be issued to the driver such as a curved point (a corner), a final destination, a drop-in point, a ferry harbor, an interchange to a highway and the like on or near the set route). Moreover, when the characters corresponding to the guidance point is to be displayed without applying the bird's-eye view conversion, the bird's-eye view character data may be prepared by performing a character data conversion process shown in FIG. 8, as the step S8 in FIG. 2.

Figure 8:
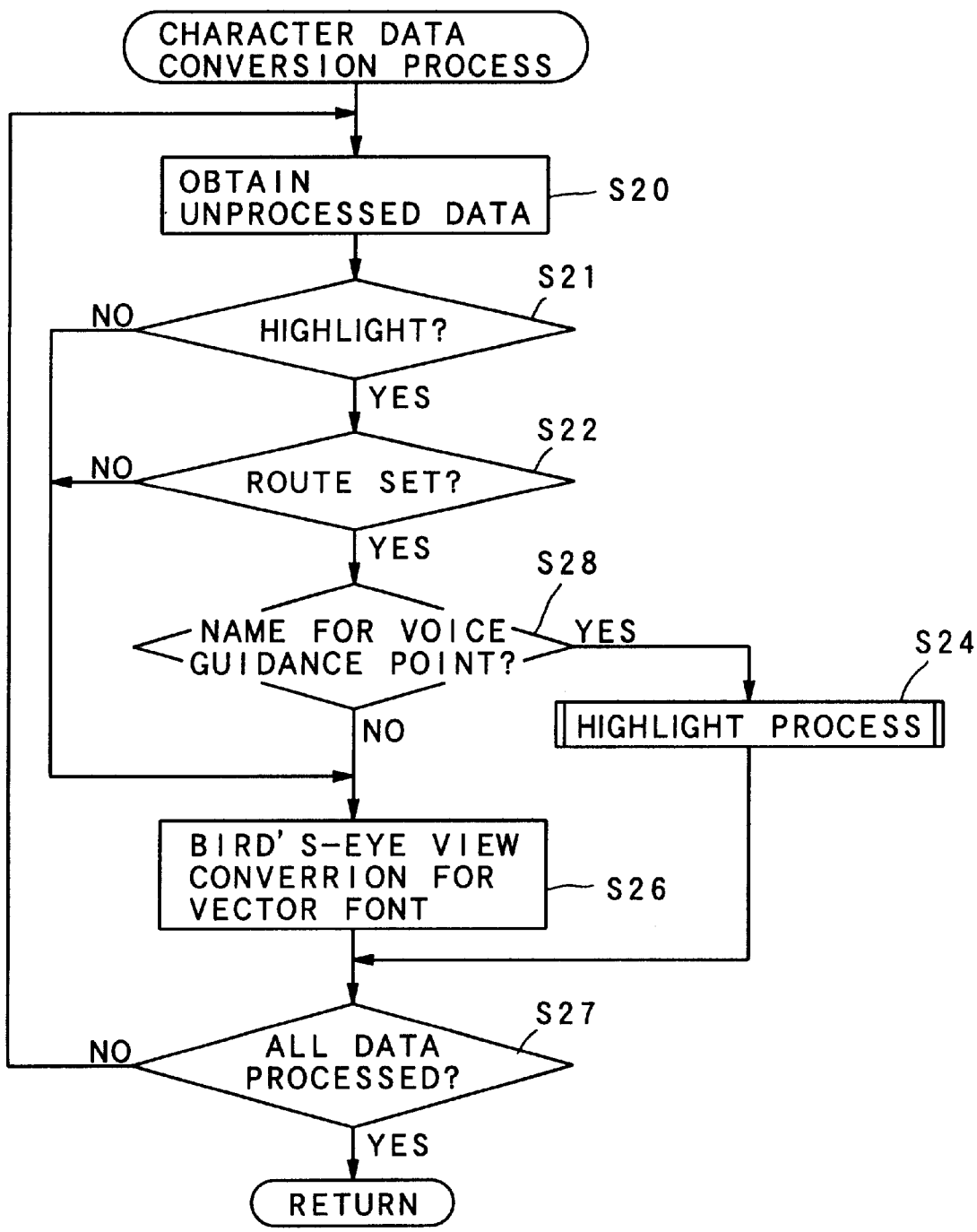
FIG. 8 is a flowchart (II) showing the first example of the process of generating the bird's-eye view character data in the embodiment.

Namely, in FIG. 8, the processes at the steps S20 to S22 are firstly performed. Then, it is judged whether or not each name corresponds to a guidance point to be guided by the audio voice (Step S28). If it is not the guidance point to be guided by the audio voice (Step S28; NO), the operational flow proceeds to the step S26 as it is. On the other hand, if it is the guidance point to be guided by the audio voice (Step S28; YES), the process at the step S24 is performed. Then, the operational flow proceeds to the step S27.

Figure 9:
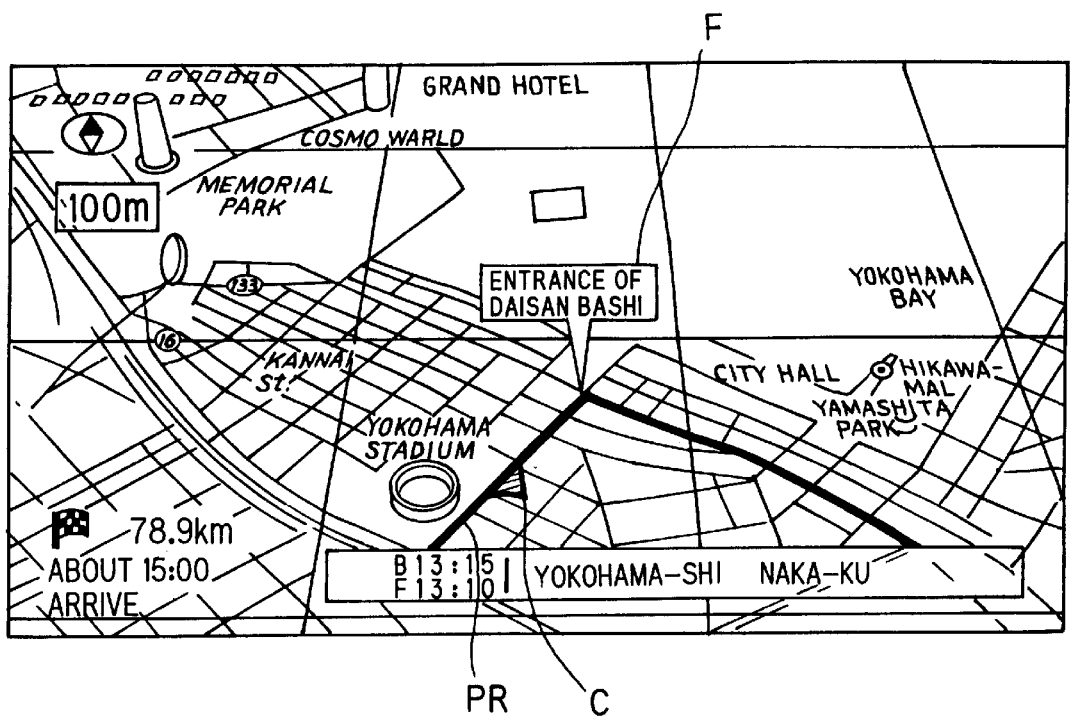
FIG. 9 is a diagram (II) showing one example of the executed result of the bird's-eye view display process in the embodiment.

After the process shown in FIG. 8 is performed, for example, a bird's-eye view shown in FIG. 9 is displayed. In an example shown in FIG. 9, a map including characters is displayed by the bird's-eye view, and further a position mark C indicative of the present position of the self-vehicle is shown on a set route PR. Moreover, the guidance point (i.e., in the example shown in FIG. 9, a point of "ENTRANCE OF DAISAN-BASHI") is displayed as a guidance point display F where the frame is added to characters to which the bird's-eye view conversion is not applied.

All the guidance points within the displayed area may not be always highlighted in the process shown in FIG. 8, but the highlight process may be performed only for the guidance point closest to the present position, or a predetermined number of guidance points close to the present position. At this time, it can be judged, on the basis of a distance between the map coordinates to which the character data corresponds and the coordinates of the position of the self-vehicle, whether or not the guidance point is close to the position of the self-vehicle.

(V) Second Example of Detailed Process of Generating Bird's-Eye View Character Data Next, a second example of the detailed process of generating the bird's-eye view character data (Step S8 in FIG. 2) is explained with reference to FIG. 11 and the flowchart shown in FIG. 10. In the second example, the bird's-eye view conversion process in case that the character data stored in the CD-ROM disk DK is a so-called image font is explained. Here, the image font does not imply the above mentioned vector font in which one character or symbol is contained as the coordinates for each line segment, but implies a font in which a character or symbol is represented as a set of pixels (dots) on the display device 16 as one image data as a whole.

In the explanation of the second example, steps same as those in the flowchart of FIG. 5 carry the same step numbers, and the detailed explanations thereof are omitted.

Figure 10:
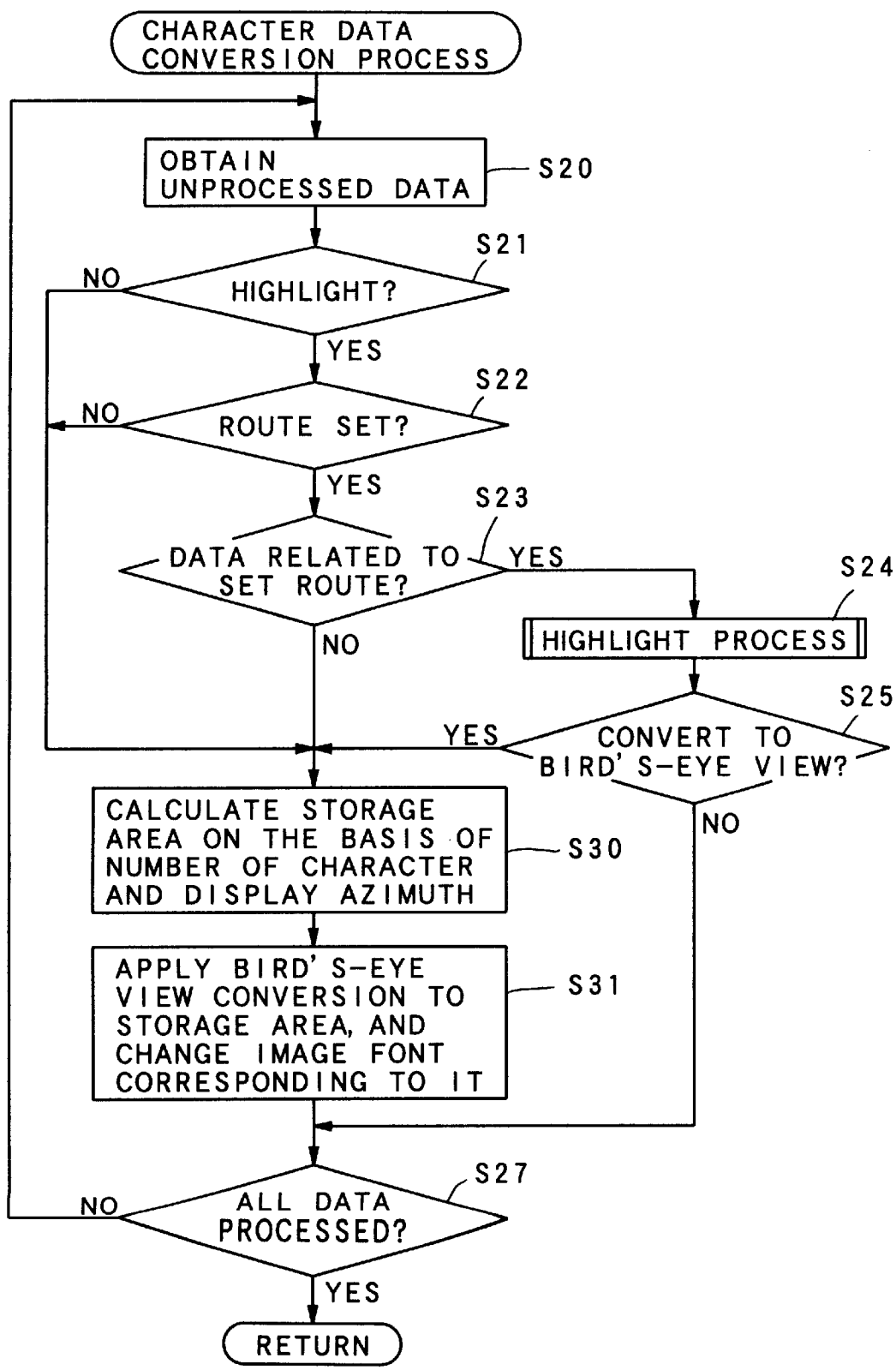
FIG. 10 is a flowchart showing a second example of the process of generating the bird's-eye view character data in the embodiment.

In FIG. 10, the operations at the steps S20 to S25 shown in FIG. 5 are firstly performed in the second example of generating the bird's-eye view character data.

If the character data to be displayed by the bird's-eye view is determined (Step S21; NO, Step S22; NO, Step S23; NO, or Step S25; YES), a storage area in which the character data (i.e. the image font) before the bird's-eye view conversion is stored is calculated on the basis of the number of characters and the display azimuth a for one name or the like (Step S30).

Figure 11A:
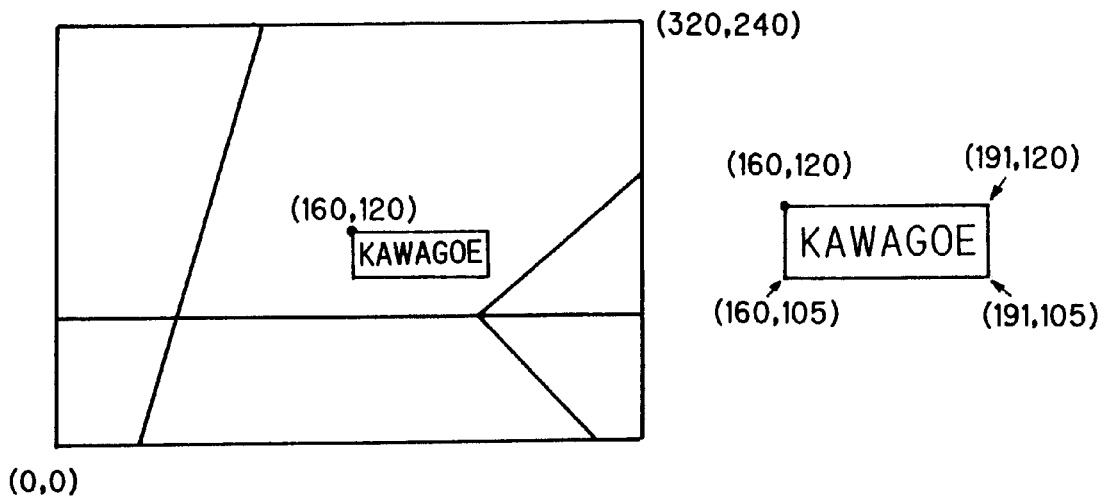
FIG. 11A is a diagram showing an area to draw an image font when the character data is the image font for the bird's eye view conversion.
Figure 11B:
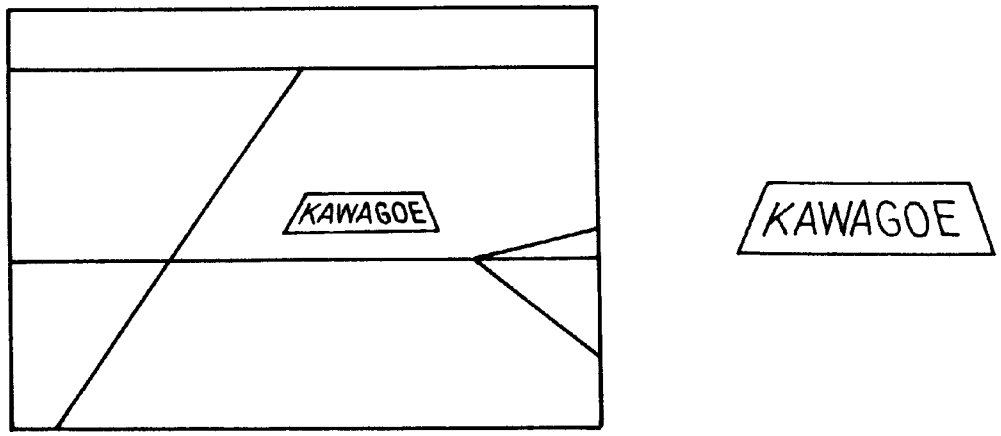
FIG. 11B is a diagram showing the image font to which the bird's-eye view conversion is applied when the character data is the image font

The operation at the step S30 is explained in more detail with reference to FIG. 11A. For the image font, an area for drawing the character data is determined by (i) one point for drawing (e.g., a point represented by (160, 120) in FIG. 11A) with respect to a left edge of a base line in the picture plane on the display device 16 as a standard point (e.g., a point represented by (0, 0) in FIG. 11A) and (ii) a font size (i.e. a character size, that is, a character size corresponding to two characters in FIG. 11A) with respect to this one point for drawing as a standard point, as shown in FIG. 11A, before the bird's-eye view conversion. For the coordinates of the points for drawing at four corners in the area for drawing the character data shown on a right side of FIG. 11A, a font size corresponding to one character is composed of 16×16 pixels. The coordinates of the respective points for drawing in the area for drawing the character data before the bird's-eye view conversion are calculated on the basis of the number of the characters of the place name or the like to be displayed and the display azimuth α, at the step S30, in accordance with the above explained method of determining the area for drawing.

Figure 3:
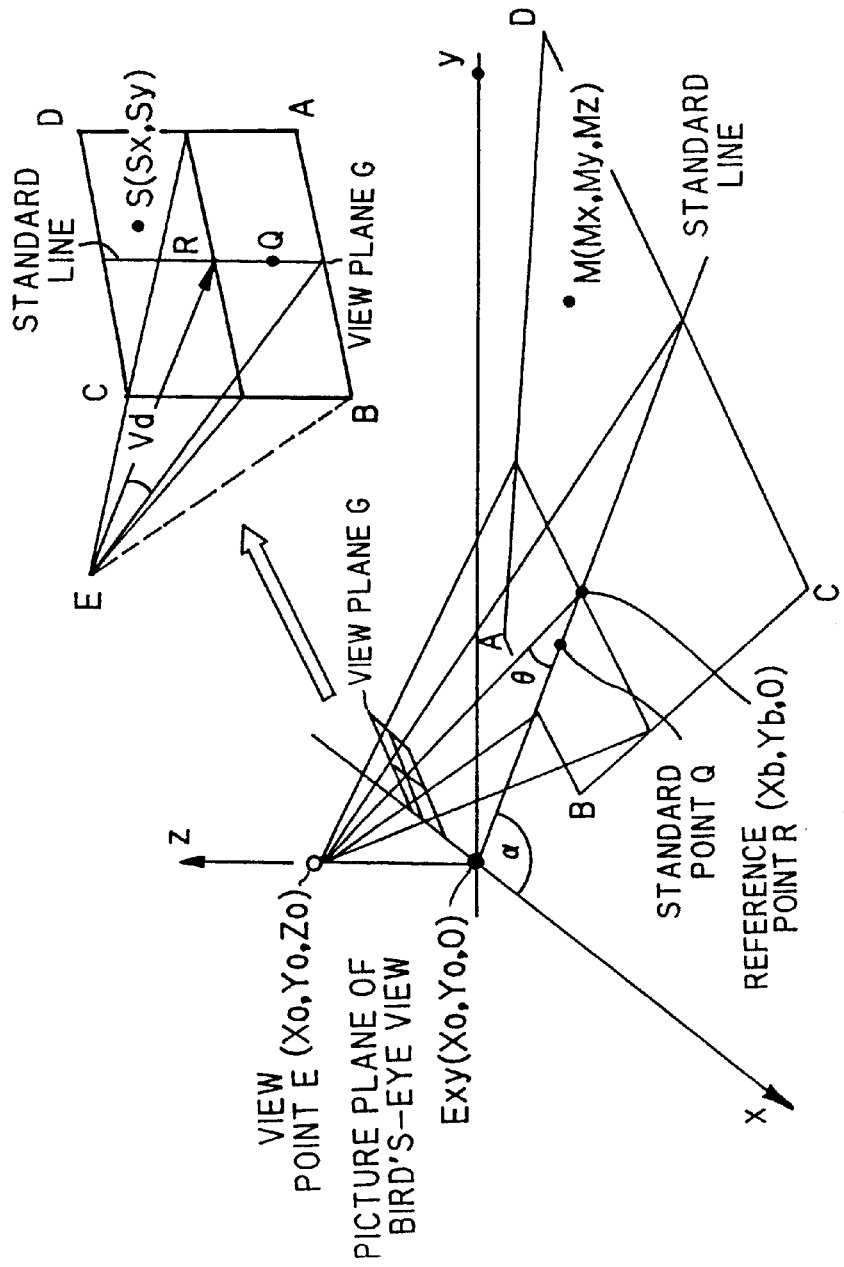
FIGS. 3A and 3B are diagrams for explaining a bird's-eye view conversion in the embodiment.

After the coordinates of the respective points for drawing the character data before the bird's eye view conversion are calculated (Step S30), the bird's-eye view conversion by using the aforementioned relation equation in the same manner as the process of generating the bird's-eye view map data shown in FIGS. 3 and 4 is applied to the points for drawing at the four corners in the area for drawing the character data. Thus, the area for drawing the character data to which the bird's-eye view conversion is applied is calculated as shown on a right side of FIG. 11B. Then, the image font of the character itself is changed so as to be contained within this calculated area, and then is written to this calculated area (Step S31). When the process at the step S31 is ended, the character data to which the bird's-eye view conversion is applied is completed as shown on the right side of FIG. 11B. Then, this converted data is stored into the RAM 8.

After that, the process at the step S27 shown in FIG. 5 is performed, and then the operational flow proceeds to the step 9 in FIG. 2.

When the bird's-eye view display process, which is shown in FIG. 2 and which includes the processes at the above explained steps S7 and S8 (i.e. the second example of generating the bird's-eye view character data) is completed, the display image which includes the character data, such as the names of the places and the like, together with the road diagram and the background, is displayed by the bird's-eye view on the display device 16 as a result, as shown in FIG. 7.

According to the above mentioned example for the bird's-eye view display process, the characters are represented in the form of the bird's-eye view, and are synthesized with the map except the characters to which the bird's-eye view conversion is also applied, to be displayed on the display device 16. Hence, it is possible to display, within the bird's-eye view, the characters having the same number as those when the characters as a plan view are synthesized with a map as a plan view.

Further, the map except the characters and the characters corresponding to it, to which the bird's-eye view conversion is applied, are simultaneously displayed together with the present position of the self-vehicle and the index indicative of the travel direction. Hence, it is possible to improve the visibility and the reality for the map at the vicinity of the present position of the self-vehicle, and the names of places and buildings and the like, on the display device 16.

Furthermore, the map, to which the bird's-eye view conversion is applied and which contains the set route, is displayed together with the characters to which the bird's-eye view conversion is applied. Hence, it is possible to display the topographical condition at the vicinity of the set route with the excellent visibility and the superior reality by using the bird's-eye view.

In case that the bird's-eye view conversion is not applied to the characters related to the set route, it is possible to display the topographical condition at the vicinity of the set route, including the present position of the self-vehicle, with the excellent visibility and the superior reality, by using the bird's-eye view, and, at the same time, possible to display the characters at the vicinity of the set route with the excellent visibility.

In case that the characters at the vicinity of the set route are highlighted and displayed, it is possible to display the names of places, buildings and the like especially at the vicinity of the set route, with the excellent visibility.

In the above described example for the bird's-eye view display process, only the characters related to the set route are implemented to be highlighted when the characters are highlighted. However, the highlight process is not limited to this. For example, it is possible to highlight even the characters which are not related to the set route. In this case, only the characters (which are not related to the set route) to be highlighted are collectively highlighted apart from the process at the step S24. After that, the bird's-eye view conversion is applied to the highlighted characters together with the characters related to the set route.

In the above described example for the bird's-eye view display process, the case is explained in which only the character data is extracted from the map data including the character data, and then the bird's-eye view conversion is applied to the map data after the character data is extracted, and further the bird's-eye view conversion is applied to the character data. However, the bird's-eye view conversion is not limited to this. For example, the bird's-eye view may be obtained such that the bird's-eye view map data is firstly prepared by applying the bird's-eye view conversion to the map data recorded differently from the character data on the CD-ROM DK, after that, only the character data is read out from the CD-ROM disk DK and the bird's-eye view character data is prepared by applying the bird's-eye view conversion to the character data, and finally they are synthesized with each other.

(VI) Modified Example of Bird's-Eye View Display Process

Next, a modified example of the bird's-eye view display process shown in FIG. 2 is explained with reference to FIGS. 12A and FIG. 12B.

In theabove mentioned examples of the bird's-eye view display process, the cases are explained in which the character data can be separated and extracted, as the vector font or the image font, from the map data other than the character data. However, in this modified example, the character data recorded on the CD-ROM disk DK is integrally recorded as the image data together with the map data other than the character data. Then, in the modified example of the bird's-eye view conversion process, the character data cannot be separated and extracted from the map data other than the character data.

In the explanation described below, same processes as those in the flowchart shown in FIG. 2 carry the same step numbers, and the detailed explanations thereof are omitted.

Figure 12A:
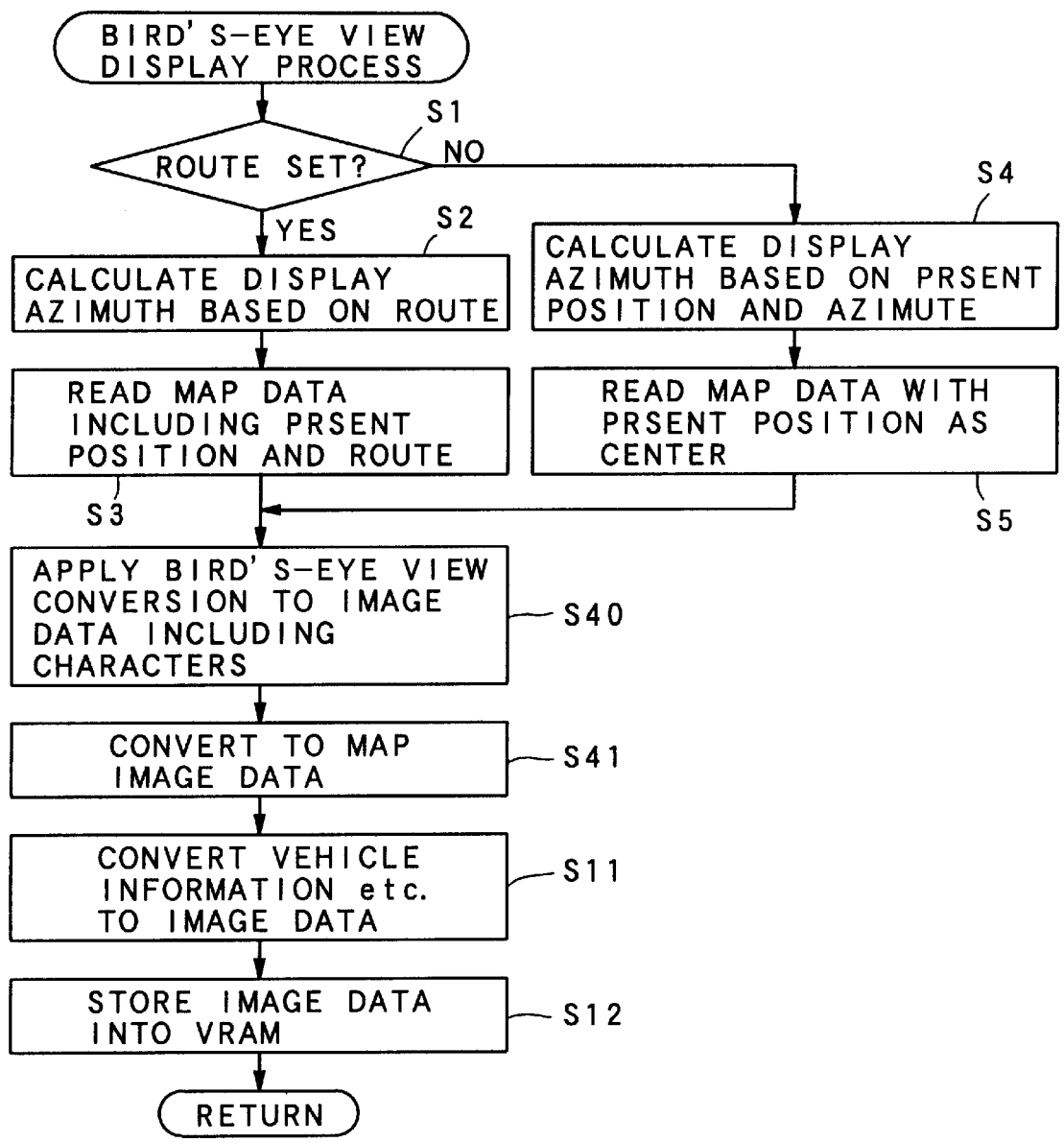
FIG. 12A is a flowchart showing a whole operation of a modified example of the bird's-eye view display process in the embodiment.

In FIG. 12A, the processes at the steps SI to S5 and S40 are performed in the CPU 6, and the processes at the steps S41, S11 and S12 are performed in the graphic controller 13.

In FIG. 12A, at first, the processes at the steps S1 to S5 shown in FIG. 2 are performed.

When the necessary map data (with which the character data is integrated) is stored in the RAM 8 (the Step S3 or S5), the bird's-eye view conversion using the aforementioned relation equation same as the process of generating the bird's-eye view map data shown in FIGS. 3 and 4 is applied to the respective points for drawing which constitute the image data including the character data (Step S40). Then, the bird's-eye view map data is converted into the map image data (Step S41). After that, the processes at the steps S11 and S12 in FIG. 2 are performed. Then, the operational flow returns to the original main navigation program.

Figure 12B:
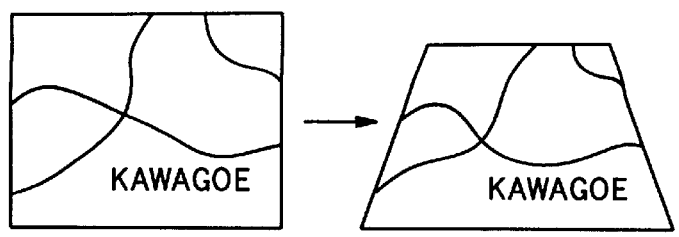
FIG. 12B is a diagram showing bird's-eye view conversion of image data including character data in the modified example of the bird's-eye view display process.
Figure 13:
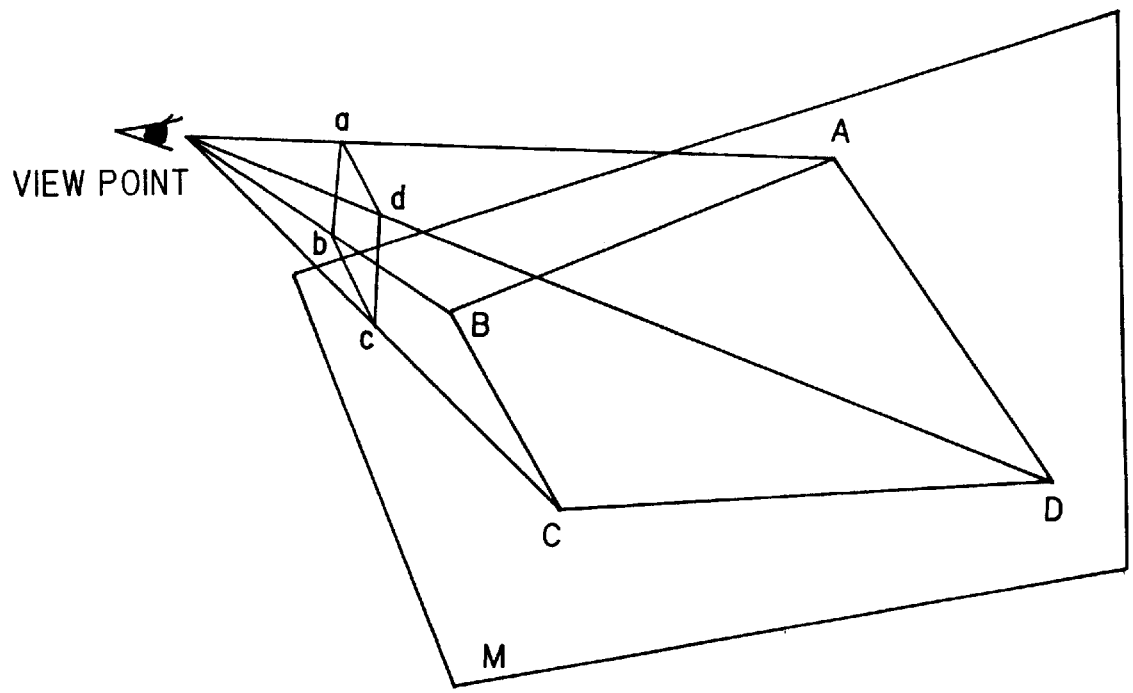
FIG. 13 is a diagram showing the bird's-eye view conversion schematically.
Figure 14:
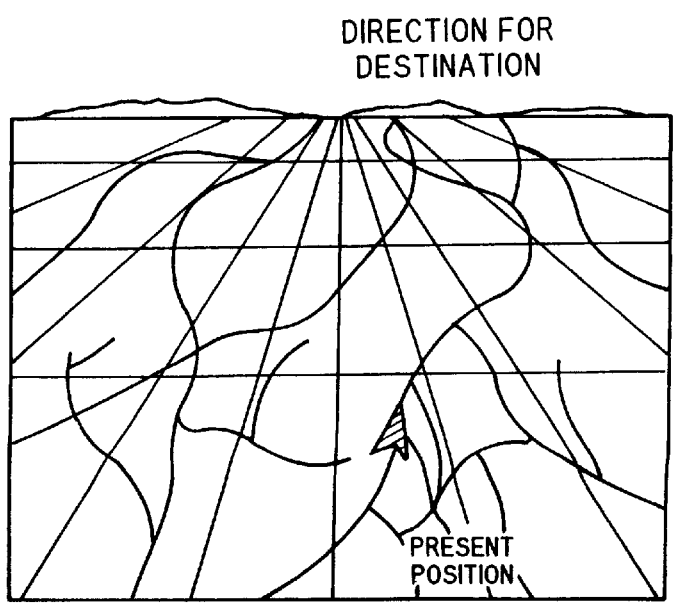
FIG. 14 is a diagram showing one example of the bird's-eye view display.
Figure 15:
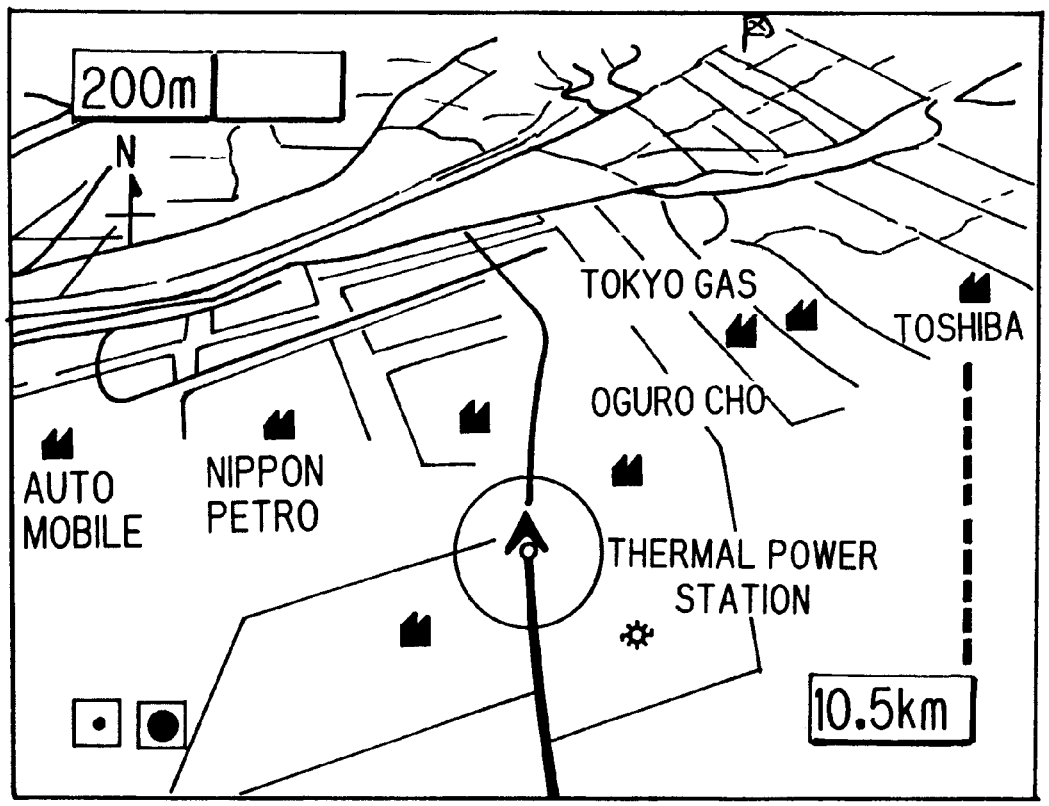
FIG. 15 is a diagram showing one example of a character display in the bird's-eye view display according to the related art.

In the process shown at the step S40 among the above mentioned processes, the bird's-eye view conversion is applied at one time to the image data in such a condition that the characters are included in the image data before the bird's-eye view conversion, as shown in FIG. 12B. After that, it is displayed.

According to the process of the modified example, even when the character data is integrally recorded as the image data together with the map data other than the character data, it is possible to attain the bird's-eye view display as shown in FIG. 7, and also possible to obtain the effect same as those of the above mentioned examples of the bird's-eye view display process.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A map information displaying apparatus in a navigation apparatus for displaying a map so as to support a travel of a movable body, comprising:

a character data extracting device for extracting character data corresponding to characters from map data corresponding to the map;

a map data converting device for converting the map data, which does not include the character data, to a bird's-eye view which is a one-point perspective projection view in which a topography corresponding to the map data is seen from one point in a sky, and outputting bird's-eye view map data indicating the bird's-eye view of the converted map data;

a character data converting device for converting the extracted character data to the bird's-eye view, and outputting bird's-eye view character data indicating the bird's-eye view of the converted character data;

a synthesizing device for synthesizing the outputted bird's-eye view character data and the outputted bird's-eye view map data corresponding to the bird's-eye view character data with each other, and generating the synthesized bird's -eye view character and map data; and a displaying device for displaying a synthesized bird's-eye view corresponding to the synthesized bird's-eye view character and map data generated by said synthesizing device.

2. A map information displaying apparatus according to claim 1, further comprising a calculating device for calculating a set route which is a travel schedule route of said movable body, wherein:

said character data extracting device extracts the character data from the map data in which the calculated set route is included; and said map data converting device converts the map data, which does not include the character data and in which the set route is included, to the bird's-eye view, and outputs the bird's-eye view map data.

3. A map information displaying apparatus according to claim 2, wherein:

said character data converting device converts the character data except the character data corresponding to the set route, among the extracted character data, to the bird's-eye view, and outputs the bird's-eye view character data; and said synthesizing device synthesizes the outputted bird's-eye view character data, the character data corresponding to the set route and the outputted bird's-eye view map data including the set route with each other, and generates the synthesized bird's-eye view character and map data.

4. A map information displaying apparatus according to claim 2, further comprising a highlight character data converting device for converting the character data corresponding to the set route, to highlight character data, which is to highlight characters corresponding to the character data, wherein:

said character data converting device converts the converted highlight character data to the bird's-eye view, and outputs bird's-eye view highlight character data indicating the bird's-eye view of the converted highlight character data; and said synthesizing device synthesizes the outputted bird's-eye view highlight character data, the outputted bird's-eye view character data and the outputted bird's-eye view map data including the set route with each other, and generates the synthesized bird's eye view character and map data.

5. A map information displaying apparatus according to claim 2, wherein the character data corresponding to the set route corresponds to a guidance point, which is set on the set route and is used to guide said movable body.

6. A navigation apparatus for displaying a map so as to support a travel of a movable body, comprising:

a character data extracting device for extracting character data corresponding to characters from map data corresponding to the map;

a map data converting device for converting the map data, which does not include the character data, to a bird's-eye view which is a one-point perspective projection view in which a topography corresponding to the map data is seen from one point in a sky, and outputting bird's-eye view map data indicating the bird's-eye view of the converted map data;

a character data converting device for converting the extracted character data to the bird's-eye view, and outputting bird's-eye view character data indicating the bird's-eye view of the converted character data;

a synthesizing device for synthesizing the outputted bird's-eye view character data and the outputted bird's-eye view map data corresponding to the bird's-eye view character data with each other, and generating the synthesized bird's-eye view character and map data;

a detecting device for detecting a present position and a travel direction of said movable body;

a superimposing device for superimposing an index indicating the detected present position and travel direction onto the synthesized bird's-eye view character and map data generated by said synthesizing device, to which the detected present position is included; and a displaying device for displaying a synthesized bird's-eye view corresponding to the synthesized bird's-eye view character and map data on which the index is superimposed.

7. A navigation apparatus according to claim 6, further comprising a calculating device for calculating a set route which is a travel schedule route of said movable body, wherein:

said character data extracting device extracts the character data from the map data in which the calculated set route is included; and said map data converting device converts the map data, which does not include the character data and in which the set route is included, to the bird's-eye view, and outputs the bird's-eye view map data.

8. A navigation apparatus according to claim 7, wherein:

said character data converting device converts the character data except the character data corresponding to the set route, among the extracted character data, to the bird's-eye view, and outputs the bird's-eye view character data; and said synthesizing device synthesizes the outputted bird's-eye view character data, the character data corresponding to the set route and the outputted bird's-eye view map data including the set route with each other, and generates the synthesized bird's-eye view character and map data.

9. A navigation apparatus according to claim 7, further comprising a highlight character data converting device for converting the character data corresponding to the set route, to highlight character data, which is to highlight characters corresponding to the character data, wherein:

said character data converting device converts the converted highlight character data to the bird's-eye view, and outputs bird's-eye view highlight character data indicating the bird's-eye view of the converted highlight character data; and said synthesizing device synthesizes the outputted bird's-eye view highlight character data, the outputted bird's-eye view character data and the outputted bird's-eye view map data including the set route with each other, and generates the synthesized bird's-eye view character and map data.

10. A navigation apparatus according to claim 7, wherein the character data corresponding to the set route corresponds to a guidance point, which is set on the set route and is used to guide said movable body.

11. A program storage device readable by a navigation apparatus for displaying a map so as to support a travel of a movable body, tangibly embodying a program of instructions executable by said navigation apparatus to perform method processes for displaying the map, said method processes comprising:

extracting character data corresponding to characters from map data corresponding to the map;

converting the map data, which does not include the character data, to a bird's-eye view which is a one-point perspective projection view in which a topography corresponding to the map data is seen from one point in a sky, and outputting bird's-eye view map data indicating the bird's-eye view of the converted map data;

converting the extracted character data to the bird's-eye view, and outputting bird's-eye view character data indicating the bird's-eye view of the converted character data;

synthesizing the outputted bird's-eye view character data and the outputted bird's-eye view map data corresponding to the bird's-eye view character data with each other, and generating the synthesized bird's-eye view character and map data; and displaying a synthesized bird's-eye view corresponding to the synthesized bird's-eye view character and map data generated by said synthesizing process.

12. A program storage device according to claim 11, wherein said method processes further comprise calculating a set route which is a travel schedule route of said movable body, wherein:

said character data extracting process extracts the character data from the map data in which the calculated set route is included; and said map data converting process converts the map data, which does not include the character data and in which the set route is included, to the bird's-eye view, and outputs the bird's-eye view map data.

13. A program storage device according to claim 12, wherein:

said character data converting process converts the character data except the character data corresponding to the set route, among the extracted character data, to the bird's-eye view, and outputs the bird's-eye view character data; and said synthesizing process synthesizes the outputted bird's-eye view character data, the character data corresponding to the set route and the outputted bird's-eye view map data including the set route with each other, and generates the synthesized bird's-eye view character and map data.

14. A program storage device according to claim 12, wherein said method processes further comprise converting the character data corresponding to the set route, to highlight character data, which is to highlight characters corresponding to the character data, wherein:

said character data converting process converts the converted highlight character data to the bird's-eye view, and outputs bird's-eye view highlight character data indicating the bird's-eye view of the converted highlight character data; and said synthesizing process synthesizes the outputted bird's-eye view highlight character data, the outputted bird's eye view character data and the outputted bird's-eye view map data including the set route with each other, and generates the synthesized bird's-eye view character and map data.

15. A program storage device according to claim 12, wherein the character data corresponding to the set route corresponds to a guidance point, which is set on the set route and is used to guide said movable body.

* * * * *

UNITED STATES PATENT AND TRADEMARK OFFICE
CERTIFICATE OF CORRECTION

PATENT NO. : 5,974,876
DATED : November 2, 1999
INVENTOR(S) : Makoto HIJIKATA et al.

It is certified that error appears in the above-indentified patent and that said Letters Patent is hereby corrected as shown below:

On the title page, in the caption of the patent, under Item [30] Foreign Application Priority Data, change "May 2, 1990" to --May 2, 1997--.

Signed and Sealed this

Second Day of May, 2000

Attest:

Attesting Officer

Q. TODD DICKINSON
Director of Patents and Trademarks